United States Patent
Sako et al.

(10) Patent No.: US 7,240,221 B2
(45) Date of Patent: Jul. 3, 2007

(54) DATA RECORDING MEDIUM, RECORDING MEDIUM RECORDING AND/REPRODUCING APPARATUS, AND RECORDING OR REPRODUCING METHOD

(75) Inventors: Yoichiro Sako, Tokyo (JP); Takashi Kihara, Chiba (JP); Shinichi Kazami, Kanagawa (JP)

(73) Assignee: Sony Corporation (JP)

( * ) Notice: Subject to any disclaimer, the term of this patent is extended or adjusted under 35 U.S.C. 154(b) by 884 days.

(21) Appl. No.: 10/362,402

(22) PCT Filed: Jun. 24, 2002

(86) PCT No.: PCT/JP02/06289

§ 371 (c)(1),
(2), (4) Date: Feb. 24, 2003

(87) PCT Pub. No.: WO03/003358

PCT Pub. Date: Jan. 9, 2003

(65) Prior Publication Data

US 2003/0174605 A1 Sep. 18, 2003

(30) Foreign Application Priority Data

Jun. 29, 2001 (JP) .............................. 2001-200014

(51) Int. Cl.
*G06F 12/14* (2006.01)
(52) U.S. Cl. ................................................. 713/194
(58) Field of Classification Search ............... 713/194; 369/26.01, 30.01, 30.03, 30.04, 30.05
See application file for complete search history.

(56) References Cited

U.S. PATENT DOCUMENTS

| 6,081,785 A | * | 6/2000 | Oshima et al. | ................. 705/1 |
| 6,141,419 A | * | 10/2000 | Gotoh et al. | ................. 705/52 |
| 2002/0120576 A1 | * | 8/2002 | Yamada et al. | ................ 705/57 |
| 2002/0172361 A1 | * | 11/2002 | Furukawa et al. | .......... 280/201 |

* cited by examiner

*Primary Examiner*—Matthew Smithers
(74) *Attorney, Agent, or Firm*—Lerner, David, Littenberg, Krumholz & Mentlik, LLP

(57) ABSTRACT

Optical discs on which enciphered data is recorded include first recording areas, where enciphered contents data is recorded, and second recording areas provided at the position where a read-out operation is carried out ahead of the first recording areas and including a first area portion, where cipher key data for decoding enciphered contents data is recorded, and a second area portion, where identification data for identification of the recording medium modulated by a modulation system different from that of at least the first area portion is recorded.

27 Claims, 12 Drawing Sheets

| sync | RECORD COMPANY ID | RECORD ID | COUNTRY NO. | FACTORY ID | MANUFA-CTURING UNIT ID | SERIAL NO. ① | SERIAL NO. ② | MDC | MDC |
|---|---|---|---|---|---|---|---|---|---|
| 16BITS | 32BITS | 16BITS | 16BITS | 32BITS | 128BITS | 128BITS | 144BITS |

512BITS

Fig. 4

Fig. 10A
DATA (SERIES X)   DATA/BIT INTERVAL T
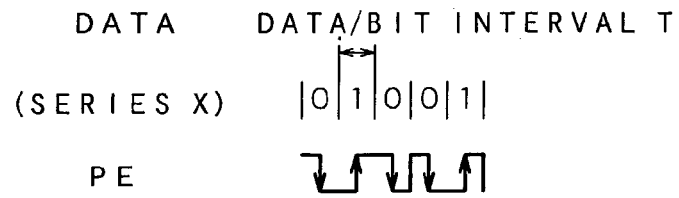
Fig. 10B
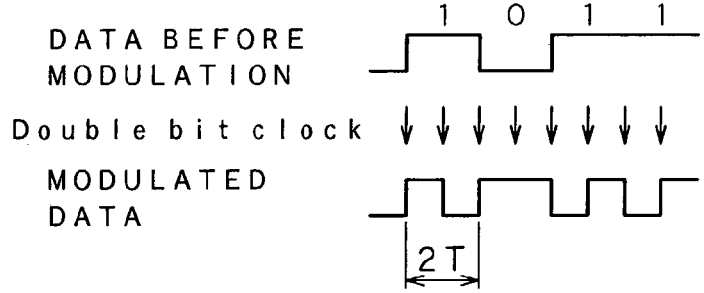
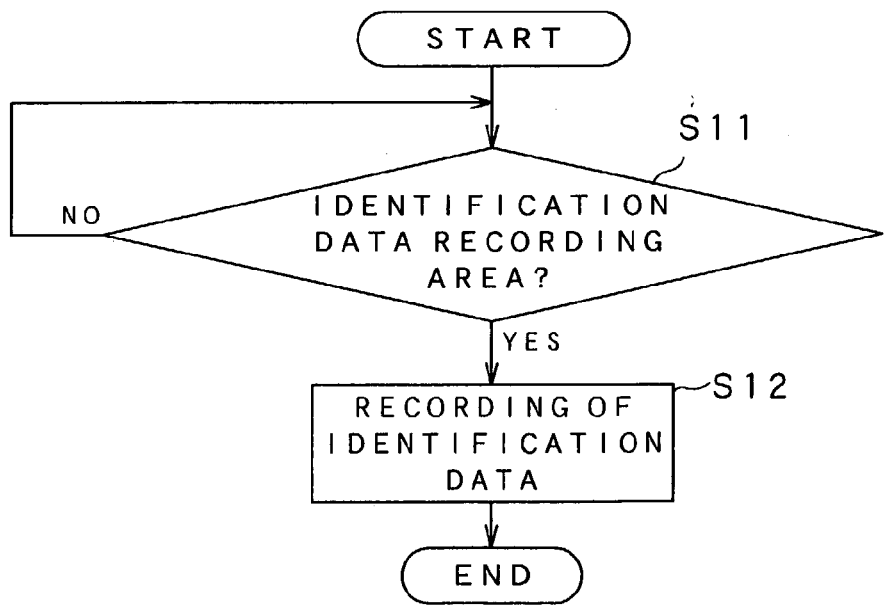
Fig. 11

DATA RECORDING MEDIUM, RECORDING MEDIUM RECORDING AND/REPRODUCING APPARATUS, AND RECORDING OR REPRODUCING METHOD

TECHNICAL FIELD

The present invention is directed to a recording medium adapted so that data such as identification data, etc. peculiar to recording medium, etc. such as serial number, etc. are recorded along with contents data, etc., relates to a recording apparatus and a recording method for recording data such as identification data peculiar to recording medium, etc. so that such data cannot be caused to undergo reproduction processing by reproduction processing means which reproduces data such as existing contents data, etc., and relates to a reproducing apparatus and a reproducing method which can reproduce recording medium where data such as identification data, etc. is recorded by this recording apparatus.

BACKGROUND ART

Hitherto, as optical disc which permits read-out of data by optical reproducing means, there are the so-called Compact Disc (hereinafter simply referred to as CD as occasion may demand) and/or Digital Versatile Disc (hereinafter simply referred to as DVD). Since such optical discs are recording media distributed in large quantities in the state where they are caused to undergo packaging, serial numbers, etc. are printed on package such as case, etc. where optical disc is accommodated in order to carry out identification of distributed optical discs.

However, since serial numbers, etc. are printed on packages, when optical discs accommodated are separated from packages, and optical discs are handled as one body, it becomes impossible to carry out identification with other optical discs only by one body of optical disc. When only optical disc is delivered or transferred to other person, it becomes impossible to carry out management of optical disc using serial number, etc.

Optical discs are adapted so that digital data are recorded and it is possible to easily make copy without involving degradation of data. When literary work data such as contents data, etc. recorded on optical disc is copied without knowledge of copyrighter or person who has copyright, profit or interest of the copyrighter would be injured.

DISCLOSURE OF THE INVENTION

An object of the present invention is to provide a recording medium adapted so that data peculiar to recording medium such as serial number, etc. is recorded along with contents data, etc. to thereby have ability to easily carry out management every recording media.

Another object of the present invention is to provide to a recording medium adapted so that data such as identification data, etc. which permits identification peculiar to recording medium recorded at the position where read-out is carried out prior to read-out of data such as contents data, etc. is recorded is not permitted to undergo reproduction processing by reproducing processing means which reproduces data such as contents data, etc. recorded by the existing system.

A further object of the present invention is to provide a recording medium which permits read-out of data peculiar to recording medium such as serial number, etc. only by regular apparatus to prevent data from being unfairly copied so that profit or interest of the copyrighter or person who has copyright can be protected.

A still further object of the present invention is to provide a recording apparatus and a recording method for recording data peculiar to recording medium which cannot be caused to undergo reproduction processing by reproduction processing means which reproduces data such as contents data, etc. recorded by the existing system.

A still more further object of the present invention is to provide a reproducing apparatus and a reproducing method which can carry out reproduction of recording medium where data peculiar to recording medium which cannot be caused to undergo reproduction processing by reproduction processing means which reproduces data such as contents data, etc. recorded by the existing system is recorded.

A further object of the present invention is to provide a recording medium, a recording apparatus, a recording method, a reproducing apparatus and a reproducing method which permit read-out of data such as serial numbers, etc. only by regular apparatus to prevent that data is unfairly copied to have ability to protect profit or interest of copyrighter.

The present invention is directed to a recording medium adapted so that enciphered data is recorded, and this recording medium comprises a first recording area where enciphered data is recorded, and a second recording area provided at the position where read-out is carried out prior to the first recording area, and including a first area portion where cipher key data for decoding enciphered data is recorded and a second area portion where data modulated by at least a modulation system different from that of at least the first area portion is recorded.

Data recorded in the second area portion is identification data peculiar to the recording medium, and is modulated by the modulation system different from that of the first area portion so that it is additionally recorded.

The second area portion is adapted so that a guide portion serving as guide when data modulated by the modulation system different from that of the first area portion is recorded is recorded in advance.

The present invention is directed to a recording method for a recording medium, which comprises: modulating laser beams emitted from a light source on the basis of enciphered data; carrying out recording with respect to a predetermined area of the recording medium by the modulated laser beams; and recording, into a recording area preceding to the predetermine area, data for decoding cryptogram of enciphered data and a guide portion for recording data modulated by a modulation system different from that of at least data for decoding cryptogram into.

The present invention is directed to a recording and/or reproducing apparatus, which comprises a rotation drive unit for rotationally driving a recording medium comprising a first recording area where enciphered data is recorded, and a second recording area provided at a position where read-out is carried out prior to the first recording area and including a first area portion where cipher key data for decoding enciphered data is recorded and a second area portion where a guide portion for recording data modulated by a modulation system different from that of at least the first area portion is formed; a head unit for scanning the recording medium; and a control unit for rotationally controlling the rotation drive unit on the basis of an output signal from the head unit, and for carrying out switching of rotation control of the rotation drive unit at least between the first area portion and the second area portion.

The control unit of the recording and/or reproducing apparatus is operative so that when the first area portion is scanned by the head unit, it carries out control of the rotation drive unit based on a synchronizing signal detected from an output signal from the head unit, and when the second area portion is scanned by the head unit, it carries out rotation control of the rotation drive unit based on inversion time period detected from an output signal from the head unit.

Here, the control unit is may be operative so that when the first area portion is scanned by the head unit, it carries out control of the rotation drive unit based on the maximum inversion time period detected from an output signal of the bead unit, and when the second area portion is scanned by the head unit, it carries out rotation control of the rotation drive unit based on inversion time period detected from an output signal from the head unit.

In addition, the control unit may be caused to be of the configuration to switch rotation control of the rotation drive unit on the basis of address information extracted from a signal which has been read out from the recording medium by the head unit.

The present invention is directed to a recording apparatus for a recording medium, which comprises: a rotation drive unit for rotationally driving a recording medium comprising a first recording area where enciphered data is recorded, and a second recording area provided at a position where readout is carried out prior to the first recording area and including a first area portion where cipher key data for decoding enciphered data is recorded and a second area portion adjacent to the first area portion and in which a guide portion for recording data is formed; a modulation unit for modulating inputted data by a modulation system different from that of at least the first area portion; a head unit for scanning the recording medium, and for recording output data from the modulation unit into the second area portion along the guide portion; and a control unit for carrying out switching so that output level when the head unit scans the second area portion to record data modulated by a modulation system different from that of the first area portion is higher than output level when the head unit scans the first area portion to record modulated data.

The modulation unit of the recording apparatus according to the present invention implements phase modulation or bi-phase mark modulation.

The present invention is directed to a reproducing apparatus for a recording medium, which comprises: a rotation drive unit for rotationally driving the recording medium comprising a first recording area where enciphered data is recorded, and a second recording area provided at a position where read-out is carried out prior to the first recording area, and including a first area portion where cipher key data for decoding enciphered data is recorded and a second area portion where data modulated by a modulation system different from that of at least the first area portion is recorded; a head unit for scanning the recording medium; and a control unit for rotationally controlling of the rotation drive unit on the basis of an output signal from the head unit, and for discriminating whether or not the recording medium is a recording medium including the second area portion, whereby when it is discriminated that the recording medium is the recording medium including the second area portion, the control unit switches control of the rotation drive unit.

The present invention is directed to a reproducing method for a recording medium, comprising: discriminating whether or not a loaded recording medium is a recording medium comprising a first recording area where enciphered data is recorded, and a second recording area provided at a position where read-out is carried out prior to the first recording area and including a first area portion where cipher key data for decoding enciphered data is recorded and a second area portion where data modulated by a modulation system different from that of at least the first area is recorded; reading out, by using a head unit, data modulated by the different modulation system recorded in the second area portion when the loaded recording medium is a recording medium including the second area portion; and decoding and reproducing enciphered data which has been read out from the first recording area on the basis of the data for decoding cryptogram which has been read out when data modulated by the different modulation system is correctly read out from the recording medium.

Still further objects of the present invention and more practical merits obtained by the present invention will become more apparent from the description of the embodiments which will be given below with reference to the attached drawings.

BRIEF DESCRIPTION OF THE DRAWINGS

FIG. 4 is a view for explaining the content of identification data.

FIGS. 10A and 10B are views for explaining phase modulation and bi-phase code modulation processing.

FIG. 11 is a flowchart for explaining the operation of recording apparatus.

BEST MODE FOR CARRYING OUT THE INVENTION

Explanation will now be given with reference to the attached drawings in connection with a data recording medium, a data recording apparatus and a recording method to which the present invention is applied.

First, explanation will be given by taking an example where the present invention is applied to an optical disc of the reproduction only type.

Figure 1:
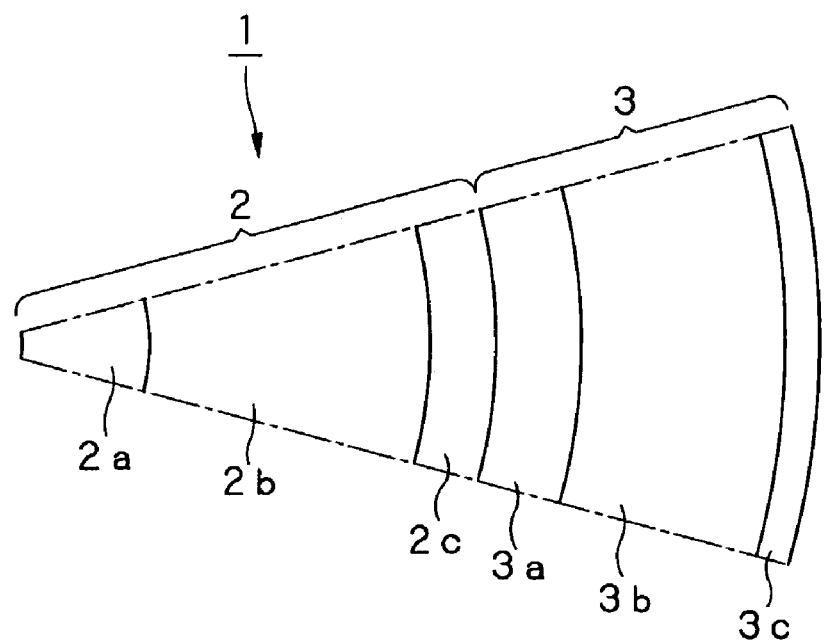
FIG. 1 is a view showing recording area of an optical disc according to the present invention.

As shown in FIG. 1, the optical disc 1 according to the present invention is adapted so that two sessions are provided. As shown in FIG. 1, the first session 2 is provided at the inner circumferential side of the optical disc 1, and the second session 3 is provided in the state positioned at the outer circumferential side of the first session 2. The first and second sessions 2, 3 are adapted so that lead-in areas 2a, 3a where TOC (Table of Contents) data, etc. is recorded are respectively provided at the inner circumferential side. At the outer circumferential side of these lead-in areas 2a, 3a, program areas 2b, 3b where program data is recorded are respectively provided. At the outer circumferential side of respective program areas 2b, 3b, lead-out areas 2c, 3c are respectively provided.

Data is recorded in the state where recording density of the second session 3 provided at the outer circumferential side of the optical disc 1 is set to a recording density higher than recording density of the first session 2 provided at the inner circumferential side, e.g., double recording density. In the program area 2b of the first session 2, advertisement data, etc. is recorded by, e.g., existing recording format employed in CD or DVD, etc. In the program area 3b of the second session 3, contents data intended for, e.g., advertisement data is recorded by the format different from that of the first session 2 after undergone encipherment.

In the program area 2b of the first session 2, audio data is recorded so that a predetermined tone, e.g., the same tone as that of CD or DVD at the time of reproduction is provided. In the program area 3b of the second session 3, audio data having tone higher than that of audio data recorded in the first session 2 is recorded. Namely, in this optical disc 1, data of which value is higher than that of the first session 2 is recorded in the second session 3. In the lead-in area 3a of the second session 3, data relating to cipher key of contents data recorded in the program area 3b after undergone encipherment (hereinafter simply referred to as cipher key data) is recorded in addition to TOC data such as address information, etc. of the second session 3. In this lead-in area 3a, identification data of this optical disc 1 is recorded.

In the optical disc 1 shown in FIG. 1, the program area 3b of the second session 3 constitutes recording area for enciphered data. The lead-in area 3a of the second session 3 is provided at the position where read-out is carried out prior to the program area 3b serving as the recording area where enciphered data is recorded, and constitutes recording area including the area portion where cipher key data for decoding enciphered data is recorded and the area portion where identification data is recorded.

It is to be noted that medium identification data indicating that optical disc 1 is an optical disc including the first session 2 and the second session 3 and address information indicating start position of the second session 3 are recorded in the lead-in area 2a provided in the state positioned at the innermost circumferential side of the optical disc 1.

Figure 2:
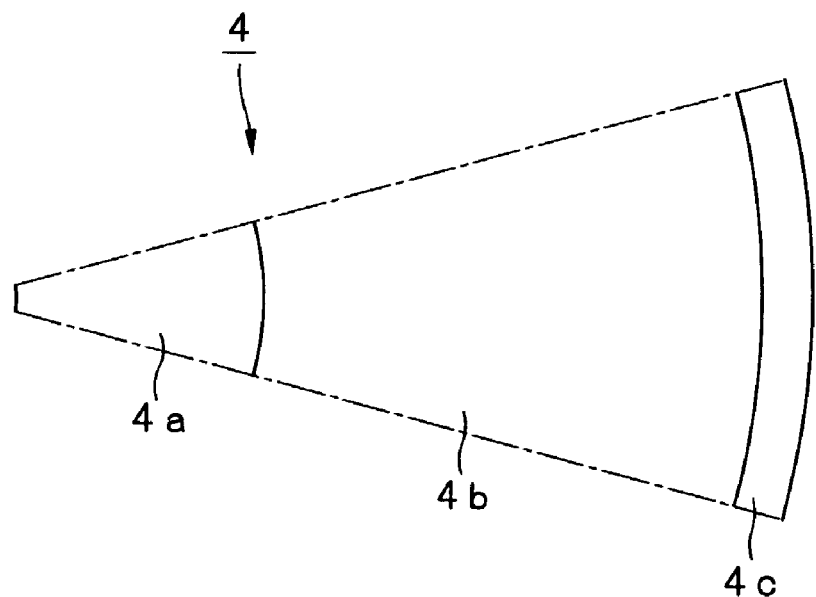
FIG. 2 is a view showing recording area of another example of an optical disc according to the present invention.

The optical disc to which the present invention is applied may be also constituted as shown in FIG. 2. This optical disc 4 is adapted so that a lead-in area 4a is provided at the inner circumferential side, a program area 4b is provided at the outer circumferential side of this lead-in area 4a, and a lead-out area 4c is provided at the outer circumferential side of this program area 4b. In the program area 4b, there is recorded enciphered contents data by the same format as that of the second session 3 of the optical disc 1 shown in FIG. 1, i.e., at a recording density caused to be higher than that of the first session 2.

In the lead-in area 4a of the optical disc 4, cipher key data of contents data recorded after undergone encipherment in the program area 4b is recorded in addition to TOC data such as address information, etc. In this lead-in area 4a, identification data which permits identification of this optical disc 4 is recorded.

In the optical disc 4 shown in FIG. 2, the program area 4b constitutes recording area for enciphered data. The lead-in area 4a is provided at the position where read-out is carried out prior to the program area 4b serving as the recording area where enciphered data is recorded, and constitutes recording area including the area portion where cipher key data for decoding enciphered data is recorded and the area portion where identification data is recorded.

Figure 3A:
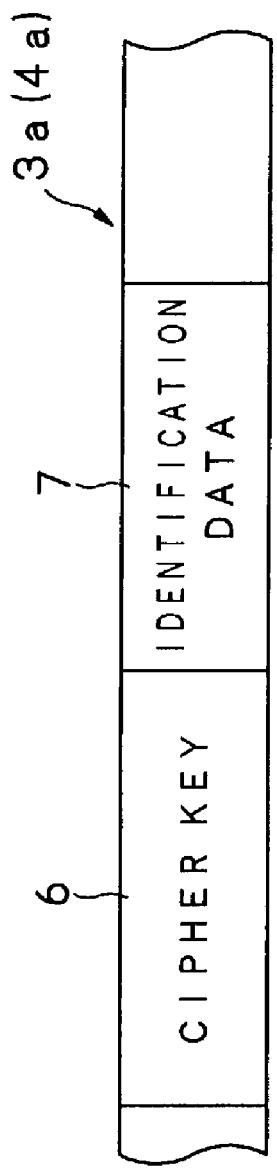
FIGS. 3A to 3C are views for explaining recording order of cipher key data and identification data stored in lead-in area of the optical discs shown in FIGS. 1 and 2.

Here, explanation will be given in connection with recording order of cipher key data and identification data recorded in the lead-in area 3a of the second session 3 of the optical disc 1 or the lead-in area 4a of the optical disc 4. As shown in FIG. 3A, identification data is recorded in an identification data recording area 7 within the lead-in area 3a or 4a, and cipher key data is recorded in a key locker area 6 provided prior to this identification data recording area 7. When identification data and cipher key data are recorded with respect to optical discs 1, 4 in order as described above, the data reproducing apparatus first carries out read-out of cipher key data from the optical discs 1, 4 thereafter to read out identification data.

It is to be noted that, in the optical discs 1, 4 according to the present invention, other data may be recorded between the identification data recording area 7 and the key locker area 6.

Figure 3B:
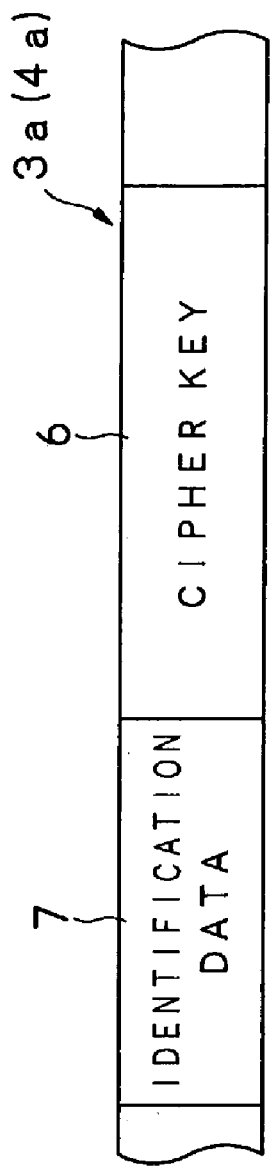

Recording order of the cipher key data and the identification data may be as shown in FIG. 3B. In the example shown in FIG. 3B, identification data is recorded into identification data recording area 7 within lead-in area 3a or 4a, and cipher key data is recorded into key locker area 6 provided next to this identification data recording area 7. When identification data and cipher key data are recorded in order as described above, the data reproducing apparatus first reads out identification data from the optical disc 1 or the optical disc 4 prior to read-out of cipher key data of the optical disc 1 or the optical disc 4.

It is to be noted that, as described also in FIG. 3A, in the optical discs 1, 4 according to the present invention, other data may be recorded between the identification data recording area 7 and the key locker area 6.

Figure 3C:
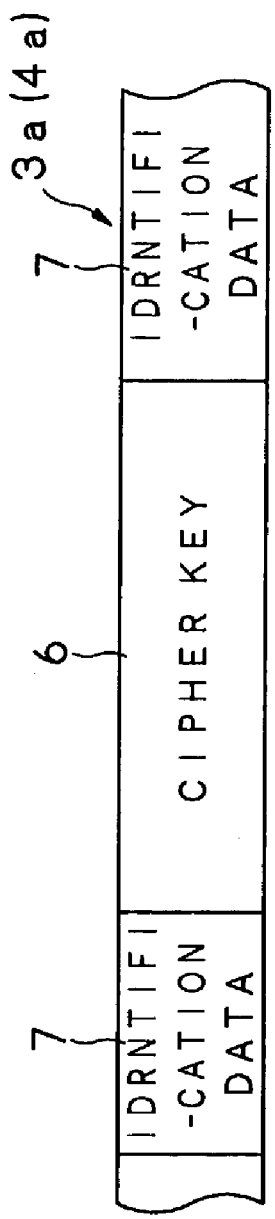

Further, recording order of the cipher key data and the identification data may be constituted as shown in FIG. 3C. In the example shown in FIG. 3C, cipher key data is recorded into key locker area 6 and identification data are respectively separately recorded in identification data recording areas 7, 7 provided before and after the key locker area 6. When the identification data and the cipher key data are recorded in order as described above, the data reproducing apparatus first reads out data of the first half portion of identification data from the preceding identification data recording area 7 thereafter to read out cipher key data from the key locker area 6 thereafter to read out data of the latter half portion of the identification data from identification data recording area 7 which will be described later.

It is a matter of course that, also in this example, as described in FIG. 3A, other data may be recorded between the identification data recording area 7 and the key locker area 6.

Explanation will be given with reference to FIG. 4 in connection with identification data to be recorded into this identification data recording area 7. Identification data is recorded by 512 bits next to synchronizing signal (sync) in the identification data recording area 7. In more practical sense, in the identification data recording area 7, record company ID data of record company which is selling agency of optical discs 1, 4 is first recorded by 16 bits, data relating to record numbers for identifying optical discs 1, 4 is then recorded by 32 bits, data relating to country number for identifying selling country of optical discs 1, 4 is then recorded by 16 bits, factory ID data for identifying factory of optical discs 1, 4 is then recorded by 16 bits, manufacturing unit ID data for identifying manufacturing unit which has manufactured optical discs 1, 4 is then recorded by 32 bits, data relating to the first serial number of optical discs 1, 4 is then recorded by 128 bits, data relating to the second serial number of optical discs 1, 4 is then recorded by 128 bits, and detection code such as MDC (Modification Detection Code), etc. for detecting whether or not data is altered is then recorded by 144 bits. After the identification data constituted as described above, error correction code is provided although not shown.

It is to be noted that, in the identification data recording area 7, data relating to URL (Uniform Resource Locator), etc. may be also stored in addition to the above so that user can acquire data relating to contents data of optical discs 1, 4 through network such as Internet, etc.

Meanwhile, optical discs 1, 4 to which the present invention is applied are essentially reproduction only recording media, wherein there is provided physical uneven pattern corresponding to data to be recorded, i.e., pit pattern consisting of plural pits except for the identification data recording area 7. The identification data shown in FIG. 4 is additionally recorded into the identification data recording area 7 where pit pattern in which pit portions and land portions which have the same length are repeatedly constituted, in more practical sense, repetitive pit pattern of pits and lands of 3T is provided.

Figure 5:
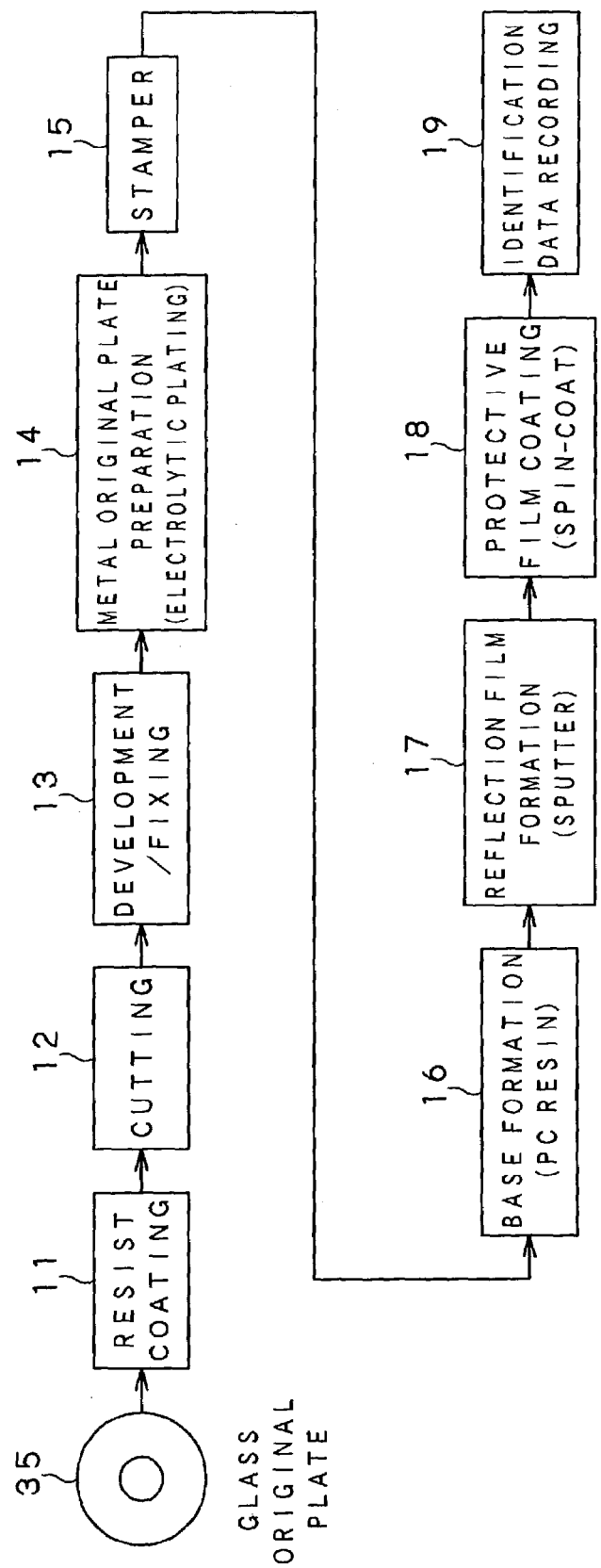
FIG. 5 is a view for explaining manufacturing process for the optical disc according to the present invention.

Here, manufacturing process for manufacturing optical discs 1, 4 according to the present invention will be described with reference to FIG. 5. In order to manufacture these optical discs 1, 4, photo-resist is first coated with respect to glass original plate at resist coating step 11 as shown in FIG. 5. Then, at cutting step 12, photo-resist film formed on the glass original plate is exposed by using laser beams emitted from gas laser unit to manufacture original plate where uneven pit pattern corresponding to data to be recorded is formed. Then, at development/fixing step 13, the original plate which has been exposed by laser beams on the basis of pit pattern is caused to undergo development processing of photo-resist, and fixing processing of developed pit pattern is implemented. Thereafter, at metal original plate manufacturing step 14, electroless plating is implemented to the surface of the developed/fixed photo-resist. Thus, metal original plate serving as mother plate is manufactured. Then, at stamper manufacturing step 15, stamper is manufactured on the basis of the metal original plate. At base (substrate) formation step 16, stamper is disposed within, e.g., injection-molding metal mold to carry out injection mold of the disc base by using transparent resin material such as carbonate or acrylate resin, etc. by employing injection molder. The pit pattern formed at the original plate at the cutting step 12 is transferred, i.e., uneven portions based on pit pattern are formed on the molded disc base. Then, at reflection film formation step 17, reflection film including aluminum as main component is formed by sputter, etc. at the surface where uneven portions based on pit pattern are formed of the disc base. In the optical discs 1, 4, identification data is additionally recorded with respect to the identification data recording area 7 portion of the optical disc 1 or 4 of this reflection film by using laser beams.

Here, for the purpose of recording identification data, it is required that the reflection film used in optical discs 1, 4 is formed by material which permits recording of data. In view of the above, the reflection film used in optical discs 1, 4 is formed by material such that reflection factor of light beams for read-out is changed by thermal recording using laser beams as light beams while having reflection factor of the same order as that of reflection film used in the so-called CD or DVD or reflection factor in which read-out can be made by optical head conventionally used. Namely, the reflection film is formed by metal film having the characteristic that reflection factor with respect to laser beams as light beams for read-out is changed within the range from about 0.5% to 10% by thermal recording by irradiated laser beams. In more practical sense, the reflection film is formed by aluminum alloy in which germanium is mixed into aluminum in extremely quantities.

At protective film coating step 18, ultraviolet hardening type resin is coated onto the reflection film formed at the reflection film formation step 17 by spin-coat method to irradiate ultraviolet rays onto the coated ultraviolet hardening type resin to harden it. Thus, protective film is formed. In the optical discs 1, 4 formed in this way, light beams are irradiated from the surface side opposite to the side of the surface where the protective film is formed. Thus, reproduction of data is carried out. Thereafter, at identification data recording step 19, identification data is recorded into the identification data recording area 7 of the optical discs 1, 4.

Figure 6:
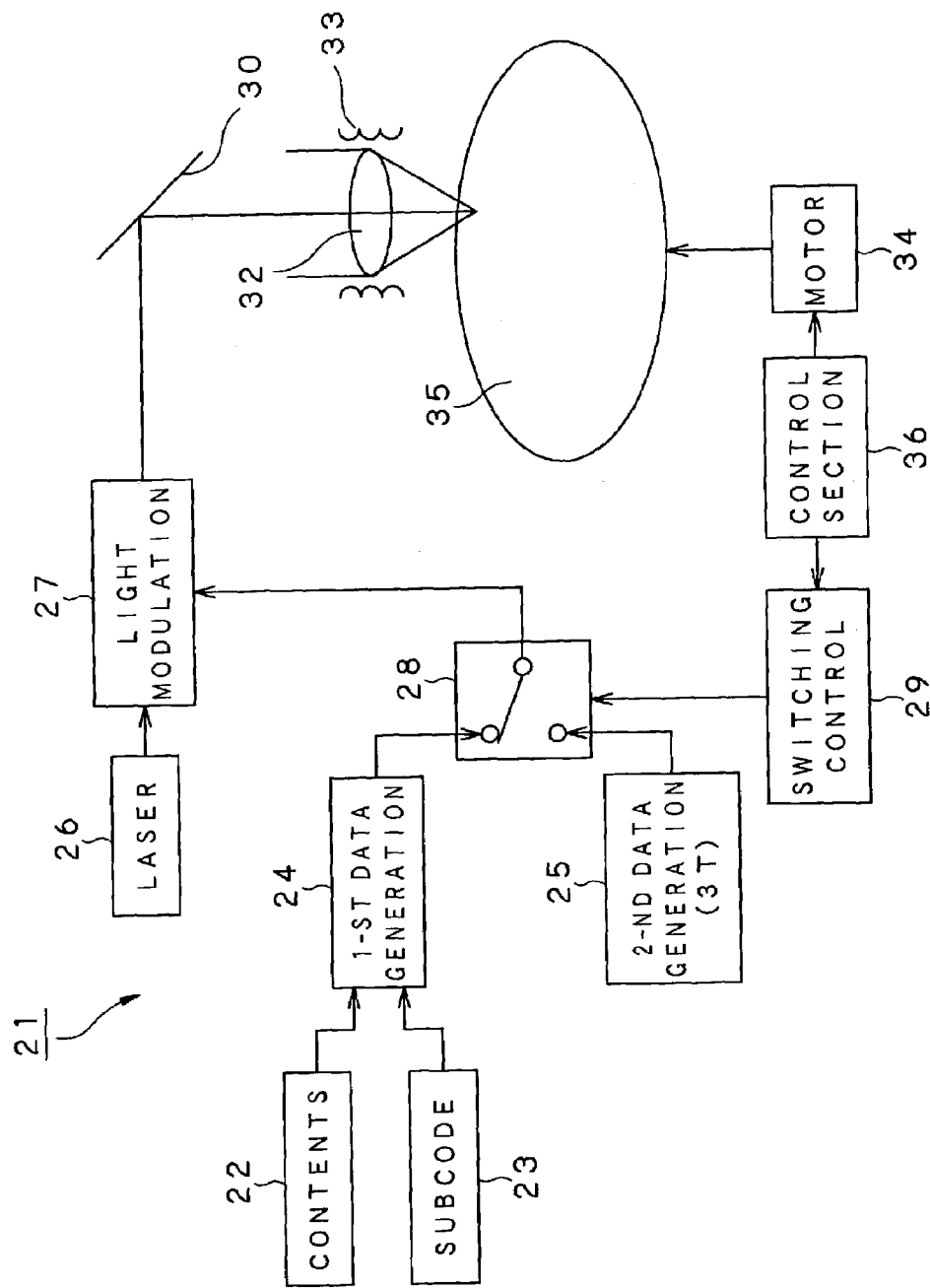
FIG. 6 is a block diagram showing cutting unit used for manufacturing disc original plate used for manufacturing the optical disc according to the present invention.

Here, a cutting unit 21 which exposes uneven pit pattern corresponding to data to be recorded by using laser beams at the cutting step 12 to manufacture original plate will be described. This cutting unit 21 comprises, as shown in FIG. 6, a contents generating section 22 for generating contents data to be recorded, a subcode generating section 23 for generating subcode data such as address information, etc., a first data generating section 24 for adding data outputted from the contents generating section 22 and subcode data outputted from the subcode generating unit 23 to generate data to be recorded, a second data generating section 25 for generating data of 3T constituting the identification data recording area 7 where individual identification data is recorded, a laser light source 26 for emitting laser beams, a light modulation section 27 for modulating laser beams on the basis of data from the first and second data generating sections 24, 25, a switching section 28 adapted to have ability to selectively input an output from the first data generating section 24 and an output from the second data generating section 25, a switching control section 29 for carrying out switching control of the switching section 28, a mirror 30 for reflecting modulated laser beams, an object lens (objective) 32 for converging laser beams onto a glass original plate 35 to irradiate them, an object lens drive section 33 for driving the object lens 32 in the optical axis direction of this object lens 32, a motor 34 serving as a drive section which rotates the glass original plate 35, and a control section 36 for controlling the motor 34.

The contents generating section 22 is operative so that when contents data to be recorded into the first session 2 of the optical disc 1 is inputted, it implements encoding by combination of cross interleave and the fourth order Reed-Solomon Code to this contents data by using algorithm of Cross Interleave Reed-Solomon Code (CIRC) thereafter to implement modulation processing thereto in accordance with algorithm of EFM (Eight to Fourteen Modulation). The contents generating section 22 is operative so that when contents data to be recorded into the second session 3 of the optical disc 2 or the optical disc 4, it enciphers contents data by using cipher key data thereafter to implement error correction encoding processing such as CIRC, etc. thereafter to carry out modulation processing such as EFM, etc. It is to be noted that modulation processing carried out here is not limited to EFM, and, e.g., 8-16 modulation may be employed and other modulation system may be also employed. The contents generating section 22 similarly carries out error correction encoding processing of cipher key data used in encipherment of contents data thereafter to carry out modulation processing. The contents generating section 22 outputs data generated in this way to the first data generating unit 24.

The subcode generating section 23 generates subcode data such as TOC data, etc. of the optical disc 1 or the optical disc 4 to output it to the first data generating section 24.

The first data generating section 24 adds data inputted from the contents generating section 22 and data inputted from the subcode generating section 23 to generate data to be recorded onto the glass original plate 35. The first data generating section 24 outputs data to be recorded to the light modulation section 27 through the switching section 28.

The second data generating section 25 generates data constituting pit pattern in which pits and lands of 3T intended to be recorded into the identification data recording area 7 provided in the lead-in area 3a of the second session 3 of the optical disc 1. Pit pattern provided in this identification data recording area 7 is not data which is significant as data, and is used exclusively for guide of laser beams as light beams in additionally recording identification data, i.e., for carrying out tracking servo, focusing servo and/or rotation servo control of the motor 34.

It is to be noted that this second data generating section 25 may generate data constituting repetitive pit pattern of 2T, 6T, 12T in addition to data constituting repetitive pit pattern of 3T. In place of this pit pattern, the so-called wobble groove serving as pregroove meandered in radial direction of the optical discs 1, 4 may be provided in the identification data recording area 7.

The switching section 28 is adapted to have ability to selectively output, to the light modulation section 27, data such as contents data, subcode, etc. outputted from the first data generating section 24 and repetitive data of pits and lands of 3T outputted from the second data generating section 25. This switching section 28 is controlled by the switching control section 29. This switching control section 29 is operative so that only when pit pattern consisting of repetition of pits and lands of 3T is recorded into the identification data recording area 7, it switches the switching section 28 so as to output data from the second data generating section 25 to the light modulation section 27, and when repetitive pattern of lands and pits of 3T is recorded, it switches the switching section 28 so as to output data from the first data generating section 24 to the light modulation section 27.

As the above-described laser light source 26, gas laser unit such as argon laser, He—Cd laser, etc. is used. As the light modulation section 27, EOM (Electrical Optical Modulator) using Pockels effect or AOM (Acoustic-Optical Modulator) using ultrasonic wave, etc. is used. The motor 34 is rotatinally controlled on the basis of, e.g., distance of light beams from the axis of rotation on which the glass original plate 35 rotates, i.e., center of rotation of the glass original plate 35 so that linear velocity becomes constant. With respect to laser beams converged onto photo-resist of the glass original plate 35 by the object lens 32, rotation drive mechanism including the motor 34 which rotates the glass original plate 35 is moved in the radial direction of the glass original plate 35 by movement mechanism (not shown).

Figure 7:
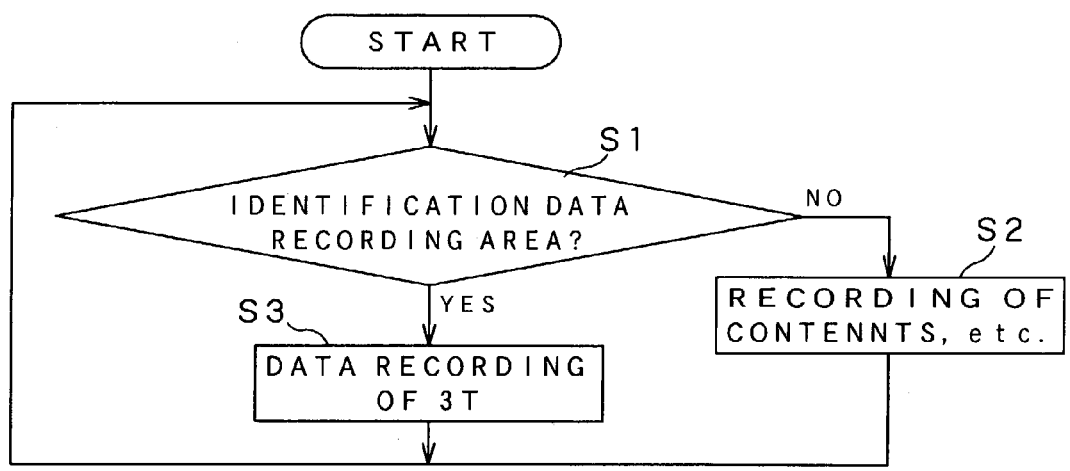
FIG. 7 is a flowchart for explaining the operation of the cutting unit.

Then, explanation will be given with reference to FIG. 7 in connection with the operation that the cutting unit 21 as described above records data onto the glass original plate 35. First, at step S1, the switching control section 29 judges whether or not recording position is the identification data recording area 7 of the area corresponding to lead-in area 3a or 4a of the optical disc 1 or the optical disc 4 in the case where such disc is considered as final product. When the recording position is not the identification data recording area 7, processing by the switching control section 29 proceeds to step S2. When the recording position is the identification data recording area 7, processing by the switching control section 29 proceeds to step S3. The discrimination as to whether or not the recording position is the identification data recording area 7 is carried out by detecting position of the glass original plate 35 moved by movement mechanism which is not shown in FIG. 6.

When the recording position is not the identification data recording area 7, the switching control section 29 switches, at step S2, the switching unit 28 so as to connect the first data generating section 24 and the light modulation section 27 in order to carry out recording/cutting of data generated in the first data generating section 24 with respect to the glass original plate 35. When contents data to be recorded is inputted to the contents generating section 22, the contents generating section 22 carries out error correction encoding processing, EFM modulation processing, etc. of this contents data. The contents generating section 22 is operative so that when contents data to be recorded into the second session 3 of the optical disc 1 or contents data to be recorded onto the optical disc 4, it carries out encipherment processing by cipher key data thereafter to carry out error correction encoding processing and/or EFM modulation processing. The contents generating section 22 also carries out error correction encoding processing and/or modulation processing, etc. of cipher key data. The contents generating section 22 outputs data to which a predetermined processing is implemented to the first data generating section 24. Herewith, the subcode generating section 23 generates address information, etc. to output it to the first data generating section 24. The first data generating section 24 adds data from the contents generating section 22 and the subcode generating section 23 to generate data to be recorded. The first data generating section 24 outputs data to be recorded to the light modulation section 27 through the switching section 28. The light modulation section 27 modulates laser beams emitted from the light source 26 on the basis of data delivered from the data generating section 24 through the switching section 28. For example, the light modulation section 27 carries out, on the basis of data from the data generating section 24, modulation to turn ON or OFF laser beams from the laser light source 26 by transmitting or interrupting them.

When the recording position is the identification data recording area 7, the switching control section 29 switches, at step S3, the switching section 28 so as to connect the second data generating section 25 and the light modulation section 27. The second data generating section 25 generates data serving as repetitive pit pattern of pits and lands of 3T recorded in the identification data recording area 7. The second data generating section 25 outputs data to be recorded to the light modulation section 27 through the switching section 28. By the light modulation section 27, laser beams from the laser light source 26 are modulated similarly to the above-described case.

The laser beams which have been modulated by the light modulator 27 are incident on the mirror 30. The mirror 30 bends optical path of the laser beams modulated by the light modulation section 27 by 90° toward the glass original plate 35. The laser beams of which optical path has been bent by the mirror 30 are converged by the object lens 32, and are irradiated onto the glass original plate 35 rotated by the motor 34 serving as rotation drive section in the state where such laser beams are converged. At this time, the object lens 32 is caused to undergo drive displacement in the optical axis direction of laser beams by the object lens drive section 33. Thus, focus control is carried out.

The stamper is formed in accordance with the above-described process shown in FIG. 5 on the basis of the glass original plate 35 formed by cutting unit 21 as stated above.

It is to be noted that when optical discs 1, 4 are not reproduction only optical disc, but are write-once disc capable of recording data only by one or rewrite disc capable of rewriting information, e.g., a light deflector is inserted between mirror 30 and object lens 32 to allow laser beams to undergo displacement in the radial direction of the glass original plate 35 by the light deflector on the basis of address information, etc. to form wobble grooves at the disc base (substrate) by using the cutting unit 21. At the time of recording of data onto optical disc which permits recording of data, it is sufficient to record contents data, etc. within grooves along the wobble grooves. In this case, in the data recording apparatus which records identification data, it is sufficient to detect maximum inversion interval on the basis of maximum value and minimum value at a predetermined period of wobble of grooves to carry out ordinary rotation servo control of motor which rotates optical disc to record contents data, etc.

Here, the state where data is recorded in the lead-in area 3a of the second session 3 of the optical disc 1 or the lead-in area 4a of the optical disc 4 will be described in practical sense.

Figure 8A:
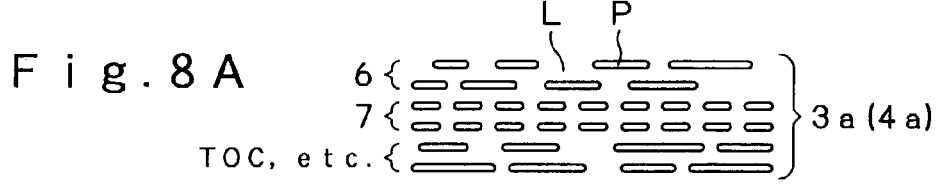
FIGS. 8A and 8B are views for explaining the configuration of lead-in area of optical disc.

As shown in FIG. 8A, when the identification data recording area 7 is provided next to the key locker area 6 (see FIG. 3A), pit pattern corresponding to cipher key data is first provided and pit pattern where pits P and lands L of 3T are repeated is provided in the identification data recording area 7 provided next to the key locker area 6 within lead-in area 3a or 4a. In the identification data recording area 7, identification data is additionally recorded with respect to the reflection film on the recording tracks or between the recording tracks. It is a matter of course that when the identification data recording area 7 is provided prior to the key locker area 6 as shown in FIG. 3B, pit pattern where pits P and lands L of 3T recorded in the identification data recording area 7 is provided before key locker area 6 in FIG. 8A. When identification data recording areas 7 are provided at both sides of the key locker area 6 as shown in FIG. 3C, pit patterns where pits P and lands L of 3T recorded in the identification data recording area 7 are provided before and after the key locker area 6 in FIG. 8A.

Figure 8B:
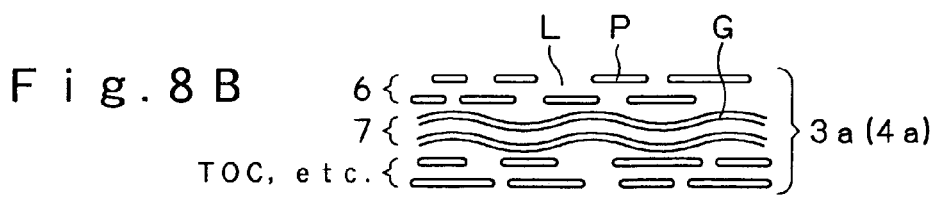

When the identification data recording area 7 is constituted by sinewave-shaped wobble grooves, there is provided a configuration as shown in FIG. 8B. Namely, when identification data recording area 7 is provided next to key locker area 6 (see FIG. 3A), pit pattern corresponding to cipher key data is first provided in the key locker area 6, and wobble grooves G are provided in identification data recording area 7 provided next to the key locker area 6 within lead-in area 3a or 4a. In the identification data recording area 7, identification data is additionally recorded with respect to the reflection film on the recording tracks or between the recording tracks. It is a matter of course that when identification data recording area 7 is provided prior to key locker area 6 as shown in FIG. 3B, wobble grooves G provided in the identification data recording area 7 are provided before key locker area 6 in FIG. 8B. When identification data recording areas 7 are provided at the both sides of key locker area 6 as shown in FIG. 3C, wobble grooves G recorded in the identification data recording area 7 are provided before and after the key locker area 6 in FIG. 8B. These wobble grooves G are formed so as to take sinewave shape in the state where period of wobble is fixed.

Figure 9:
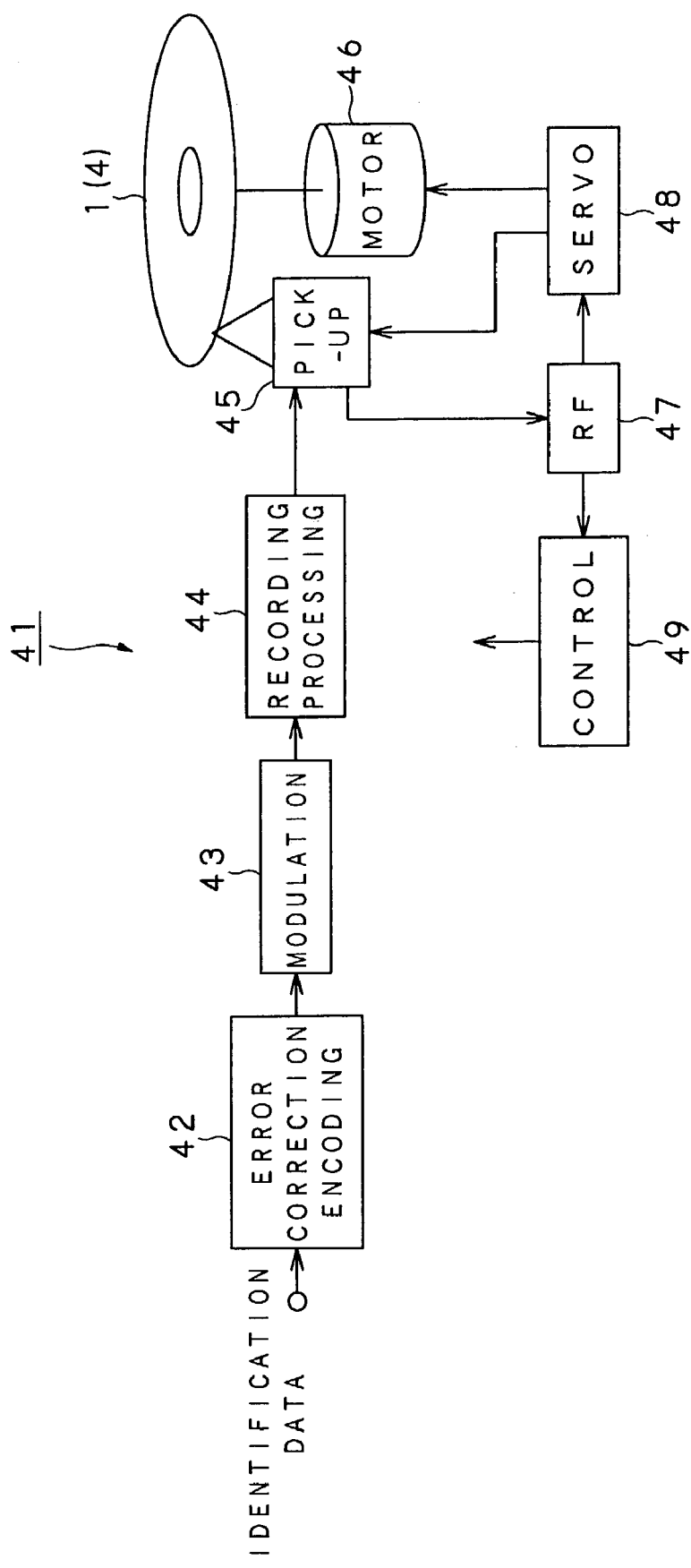
FIG. 9 is a block diagram of a recording apparatus for recording identification data into identification data recording area.

In the optical discs 1, 4 as stated above, identification data as shown in FIG. 4 is additionally recorded into identification data recording area 7 by, e.g., record company, etc. Here, explanation will be given with reference to FIG. 9 in connection with a data recording apparatus 41 which additionally records identification data into identification data recording area 7 of optical discs 1, 2 manufactured in a manner as stated above. This data recording apparatus 41 comprises an error correction encoding unit 42 for implementing error correction encoding processing to identification data, a modulation unit 43 for implementing modulation processing to the identification data to which the error correction encoding processing has been implemented, a recording processing unit 44 which carries out recording processing for carrying out recording onto the optical discs 1, 4, an optical pick-up 45 for irradiating light beams to the optical discs 1, 4 to additionally record identification data, a motor 46 which rotates the optical disc 1 or 4 at, e.g., CLV (Constant Linear Velocity), a RF amplifier 47 for generating RF signal, etc., a servo control unit 48 for carrying out focusing control and tracking control of the optical pick-up 45 and/or rotation control of the motor 46, and a control unit 49 for controlling the entirety of the data recording apparatus 41 in such a manner to record identification data into the identification data recording area 7.

The error correction encoding unit 42 generates error correction code to add the error correction code to identification data to output it to the modulation unit 43.

The modulation unit 43 implements modulation processing to data inputted from the error correction encoding unit 42. In more practical sense, the modulation unit 43 carries out phase modulation. Namely, as shown in FIG. 10A, the modulation unit 43 carries out modulation processing of data inputted from the error correction encoding unit 42 so that when input data is "1", bit center of modulated data rises, when input data is "0", bit center of modulated data falls, and when the same codes are successive, inversion is carried out once more at the boundary of bit.

It is to be noted that the modulation unit 43 may carry out bi-phase mark modulation processing of input data. Namely, as shown in FIG. 10B, when input data is "1", the modulation unit 43 carries out modulation into "01", or "10", and when input data is "0", the modulation unit 43 carries out modulation into "00" or "11". With respect to selection of "01", "10" or selection of "00", "11", when the previous modulated data is "1", modulation into "01", "00" is carried out, and when the previous modulated data is "0", modulation into "10", "11" is carried out.

Thus, identification data inputted from the error collection encoding unit 42 is modulated in accordance with PE or bi-phase mark modulation by the modulation unit 43, and the modulated identification data is delivered to the recording processing unit 44. The recording processing unit 44 implements recording processing to the modulated identification data to output it to the optical pick-up 45.

The optical pick-up 45 comprises semiconductor laser element as a light source which emits light beams (not shown), object lens (objective) for converging light beams emitted from this semiconductor laser element, and light detector for detecting return light beams reflected at the optical discs 1, 4, etc. Light beams which have been emitted from the semiconductor laser element are converged by the object lens, and are irradiated onto the signal recording surface of the optical discs 1, 4. Here, the semiconductor laser element is adapted so that when write operation of identification data is carried out, it emits light beams having level higher than that at the time of read-out so as to have ability to thermally record data onto the reflection film of optical disc 1 or 4. For example, the optical pick-up 45 is operative so that when "1" is recorded, it irradiates light beams of high output to the identification data recording area 7, and when "0" is recorded, it does not irradiate light beams of high output to the identification data recording area 7. Return light beams reflected on the signal recording surface of optical disc 1 or 4 are converted into electric signal by the light detector. The light detector outputs an electric signal as output signal to the RF amplifier 47. The object lens is held by object lens drive mechanism such as actuator, etc., and is caused to undergo drive displacement in the focusing direction in parallel to the optical axis of the object lens and in the tracking direction perpendicular to the optical axis of the object lens. When identification data is recorded onto the optical disc 1 or 4, the motor 46 rotates the optical disc 1 or 4 at, e.g., CLV.

The RF amplifier 47 generates a RF signal, a focusing error signal and a tracking error signal on the basis of an output signal from the light detector constituting the optical pick-up 45. For example, the focusing error signal is generated by the so-called astigmatism method, and the tracking error signal is generated by the so-called three beam method or the so-called push-pull method. Further, the RF amplifier 47 outputs a RF signal to the control unit 49 in order to extract address information, etc., and to output the focusing error signal and the tracking error signal to the servo control unit 48.

The servo control unit 48 generates a servo signal for controlling position of object lens in recording identification data onto the optical disc 1 or 4 to thereby adjust position of beam spot on the signal recording surface of the optical disc 1 or 4. In more practical sense, the servo control unit 48 generates a focusing servo signal on the basis of the focusing error signal, and generates a tracking servo signal on the basis of the tracking error signal. The servo control unit 48 outputs the focusing servo signal and the tracking servo signal to drive circuit of object lens drive mechanism constituting the optical pick-up 45. On the basis of a drive signal from this drive circuit, the object lens drive mechanism allows the object lens to undergo drive displacement in the focusing direction in parallel to the optical axis of the object lens on the basis of the focusing servo signal, and allows the object lens to undergo drive displacement in the tracking direction perpendicular to the optical axis of the object lens on the basis of the tracking servo signal. As a result, spots based on light beams irradiated onto the optical disc 1 or 2 scan repetitive pattern of pits or lands of 3T or grooves formed in the identification data recording area 7 in the in-focus state.

In order to control the motor 46 so that the optical disc 1 or 4 can be rotated at CLV, clock signal, etc. extracted from RF signal is inputted to the servo control unit 48. The servo control unit 48 carries out, on the basis of the clock signal extracted from the RF signal, servo control of at least two stages of rough rotation servo control until PLL (Phase Locked Loop) is locked and servo control carried out in the state where PLL is locked.

When identification data is recorded into the identification data recording area 7, since the identification data recording area 7 is constituted by pit pattern where pits and lands of 3T are repeated, the servo control unit 48 cannot detect synchronizing signal similarly to other area. In view of the above, when identification data is recorded into the identification data recording area 7, the servo control unit 48 detects inversion interval from the maximum value and the minimum value of pulse width of signal, e.g., at a predetermined period of pits and lands of 3T to handle this value as synchronizing signal to carry out rough rotation servo control. It is to be noted that the servo control unit 48 may carry out rough servo control by using, e.g., free-running frequency in addition to the above.

When data except for the identification data recording area 7 is read out, the servo control unit 48 detects, at the time of start of rotation, etc., the maximum inversion interval from the maximum value and the minimum value of pulse width of signal to carry out rough rotation servo control by using the detected maximum inversion interval as frame synchronizing signal (11T, 11T' (' indicates inversion)) so that PLL can be locked thereafter to carry out rotation servo control in the state where PLL is locked, i.e., in the state where frame synchronizing signal and reference signal of the data recording apparatus 41 are synchronized with each other to read out TOC data such as address information, etc. so that the identification data recording area 7 can be specified.

The control unit 49 extracts subcode data from RF signal outputted from the RF amplifier 47. The control unit 49 specifies the identification data recording area 7 from address information, etc., whereby when there results the state where the optical pick-up 45 can record identification data into the identification data recording area 7, it outputs a switching signal to the servo control unit 48 so as to switch rotation servo control into rough rotation servo control.

Then, the operation of the data recording apparatus constituted as described above will be described. First, when recording operation of recording data is started, the spindle motor 46 rotates optical disc 1 or 4. At this time, the servo control unit 48 detects the maximum inversion interval from the maximum value and the minimum value of pulse width of signal to handle value of this detected maximum inversion interval as frame synchronizing signal, or to use free-running frequency to thereby carry out rough rotation servo control of the motor 46 until PLL is locked. When PLL is locked, the servo control unit 48 controls the motor 46 by ordinary rotation servo control. As a result, the optical disc 1 or 4 is rotated at CLV. The RF amplifier 47 generates a RF signal, a focusing error signal and a tracking error signal to output the RF signal to the control unit 49, and to output the focusing error signal and the tracking error signal to the servo control unit 48. The servo control unit 48 generates a focusing servo signal and a tracking servo signal on the basis of the focusing error signal and the tracking error signal to output them to object lens drive circuit. Thus, the object lens drive mechanism allows the object lens to undergo, on the basis of a drive signal from drive circuit, drive displacement in the focusing direction in parallel to the optical axis of the object lens and in the tracking direction of plane surface direction perpendicular to the optical axis.

The optical pick-up 45 starts read-out of data from the inner circumferential side of the optical disc 1 or 4. As shown in FIG. 11, the control unit 49 extracts subcode data from RF signal to judge, at step S11, whether or not scanning position of the optical pick-up 45 reaches the identification data recording area 7 from address information, etc. of the extracted subcode data. When the scanning position of the optical pick-up 45 reaches the identification data recording area 7, processing by the control unit 49 proceeds to step S12. When the scanning position of the optical pick-up 45 does not reach the identification data recording area 7, the step S11 is repeated. At the step S12, the control unit 49 outputs a switching signal to the servo control unit 48 so as to switch rotation servo control into rough control, and the servo control unit 48 drives the motor 46 by rough rotation servo control. In more practical sense, the servo control unit 48 detects inversion interval from the maximum value and the minimum value of pulse width at a predetermined period of pit pattern consisting of repetition of pits and lands of 3T of the identification data recording area 7 to handle the detected inversion interval as synchronizing signal to carry out rotation control of the motor 46. This is because, as previously described, the identification data recording area 7 consists of pit pattern where lands and pits of 3T are repeated so that ordinary rotation servo control cannot be carried out.

On the other hand, error correction code is added to identification data at the error correction encoding unit 42. Then, the identification data thus obtained is caused to undergo PE or bi-phase code modulation processing at the modulation unit 43, and is caused to undergo recording processing at the recording processing unit 44. The optical pick-up 45 carries out switching of output of light beams between standard level at the time of reproduction and high level higher than the standard level to record identification data into the identification data recording area 7. In more practical sense, the optical pick-up 45 is operative so that when "1" is recorded into the identification data recording area 7, it irradiates light beams of high output level to the identification data recording area 7, and when "0" is recorded, it irradiates light beams of the standard output level to the identification data recording area 7. Thus, identification data is thermally recorded, i.e., additionally recorded with respect to the reflection film of the identification data recording area 7 of the optical disc 1 or 4.

Figure 12A:
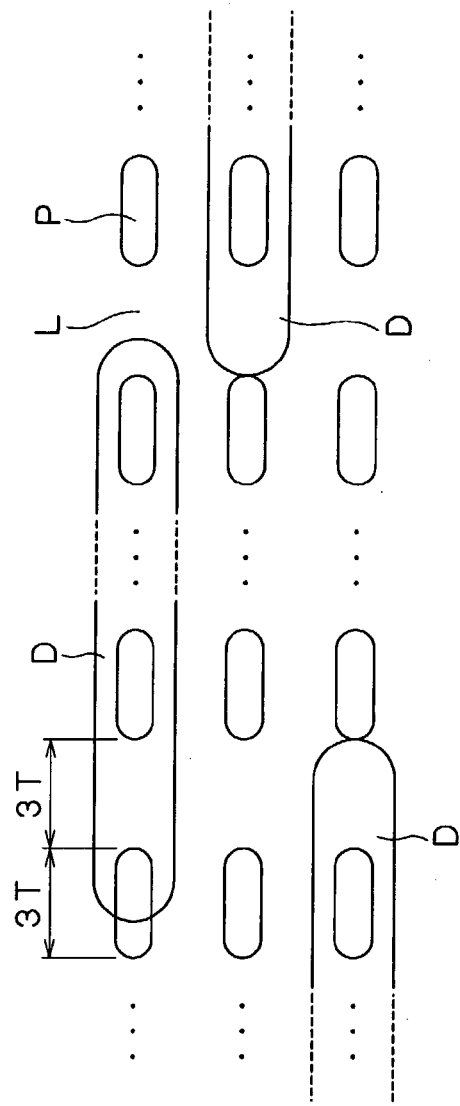
FIGS. 12A and 12B are views for explaining the state where identification data is recorded in identification data recording area.

Thus, as shown in FIG. 12A, identification data D where length of 1 bit is 42T, 84T, 98T, 196T, etc. are recorded on repetitive pit pattern of pits P of 3T and lands L of 3T in the identification data recording area 7. It is to be noted that it is better that length per 1 bit of identification data D is longer in order to have ability to stably read out identification data. While identification data D are recorded on recording tracks in the example shown in FIG. 12A, identification data may be recorded between recording tracks.

Figure 12B:
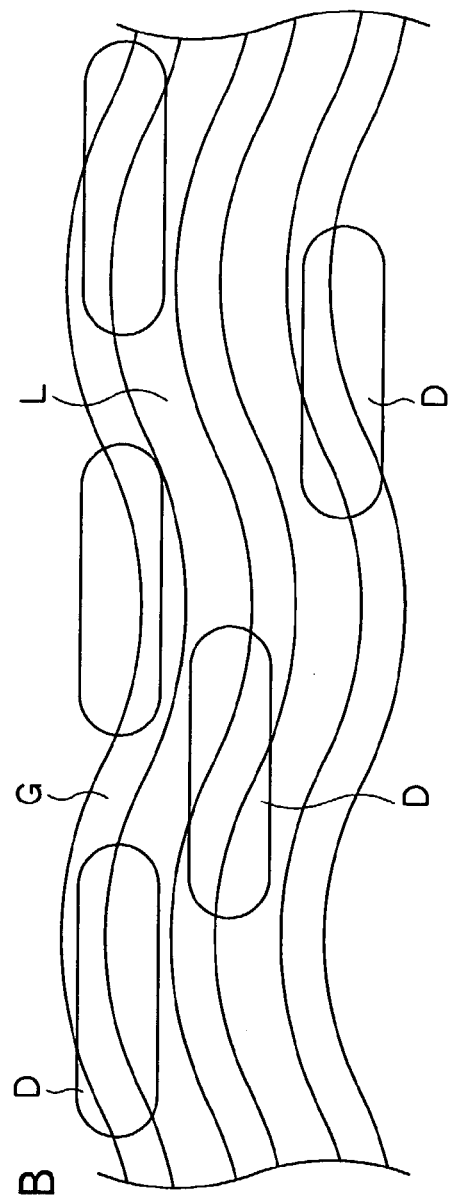

When the identification data recording area 7 is constituted with wobble grooves, identification data are recorded as shown in FIG. 12B. In this case, the servo control unit 48 detects the maximum value and the minimum value at a predetermined period of pregrooves wobbled like sine wave to handle the inversion interval as synchronizing signal to carry out rough rotation servo control. Identification data D where length of 1 bit is 42T, 84T, etc. are recorded at wobble grooves G in the identification data recording area 7. It is to be noted that, as shown in FIG. 12B, identification data may be recorded at lands between pregrooves G, and may be recorded at both lands and pregrooves.

Since the optical discs 1, 4 constituted as described above are adapted so that the identification data recording area 7 is provided in the vicinity of the key locker area 6 where cipher key data in which contents data is enciphered is recorded, in more practical sense, before and/or after that key locker area 6, it is possible to quickly carry out processing carried out before reproduction of contents data, i.e., read-out of identification data and read-out of cipher key data in data reproducing apparatus 51 which will be described later.

In the optical discs 1, 4, in order that the identification data recording area 7 cannot be read out by irregular data reproducing apparatus, such identification data recording area 7 is recorded on pit pattern consisting of repetition of pits and lands of 3T. The identification data recording areas 7 are provided before and/or after the key locker area 6 where cipher key data in which contents data is enciphered is recorded. Namely, in the optical discs 1, 4, the key locker area 6 where cipher key data necessary for decoding cryptogram of data of the program area 3b of the second session 3 of the optical disc 1 or the program area 4b of the optical disc 4 is recorded is guarded by the identification data recording area 7 which cannot be reproduced by the irregular data reproducing apparatus. Accordingly, in the optical disc, it is possible to prevent that cipher key data is unfairly read out.

In the optical discs 1, 4 to which the present invention is applied, since identification data are recorded by thermal recording onto the pit pattern of 3T provided in the identification data recording area 7, even when uneven pit pattern provided at the disc base is unfairly transferred, it is possible that even identification data is copied. Accordingly, as in the case of data reproducing apparatus 51 which will be described later, only when identification data is detected, reproduction of the program area 3b of the second session 3 of the optical disc 1 or the program area 4 of the optical disc 4 is permitted, thereby making it possible to inhibit, e.g., reproduction of optical discs unfairly manufactured.

Figure 13:
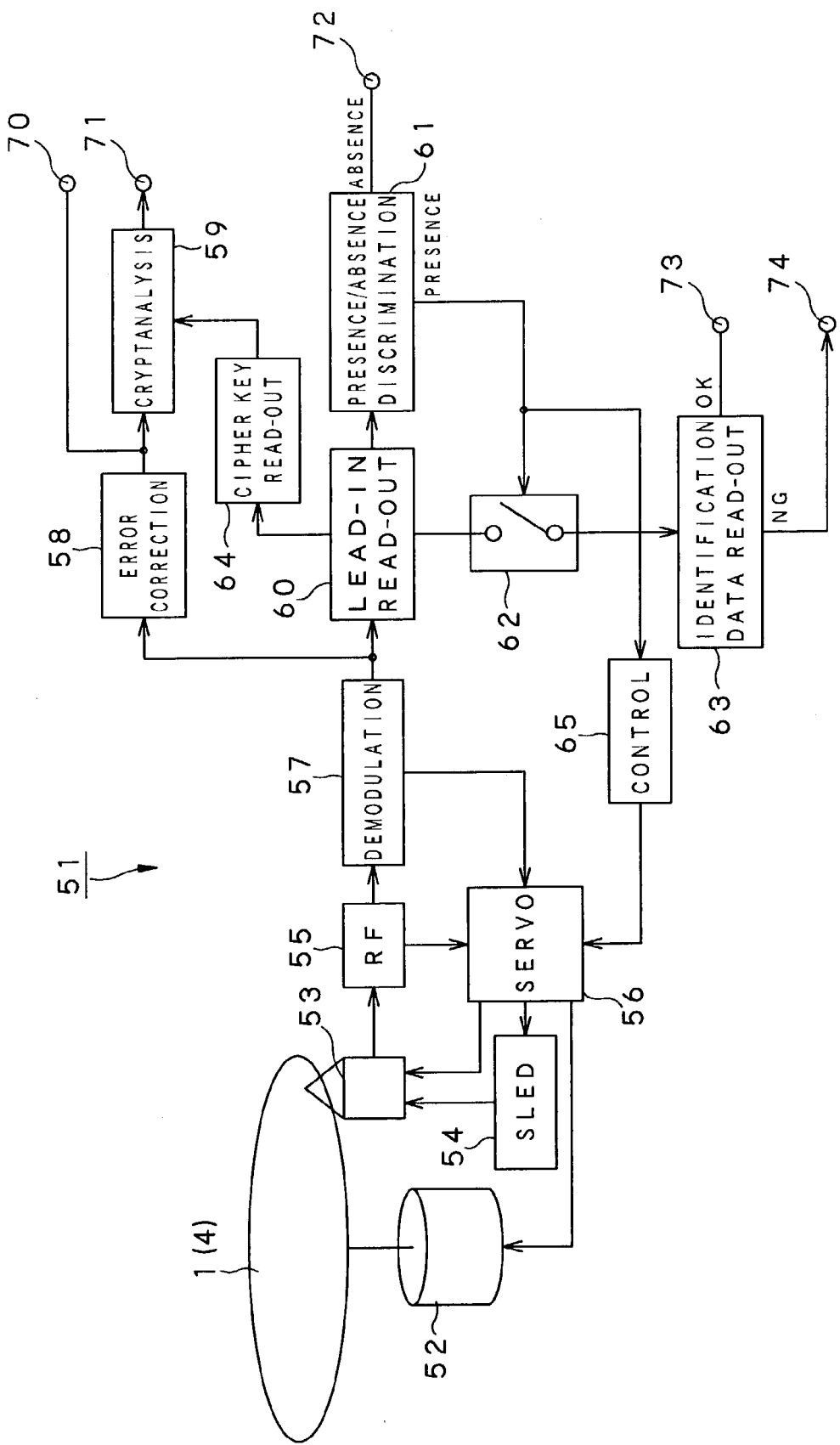
FIG. 13 is a block diagram showing a data reproducing apparatus.

Then, explanation will be given with reference to FIG. 13 is connection with data reproducing apparatus 51 for optical discs 1, 4 on which identification data is recorded as described above. This data reproducing apparatus 51 comprises a motor 52 for rotating optical disc 1 or 4, an optical pick-up 53 for irradiating light beams onto the optical disc 1 or 4 rotated by the motor 52 to detect return light beams to thereby carry out read-out of data, a sled motor 54 for moving the optical pick-up 53 in the radial direction, a RF amplifier 55 for amplifying output from the optical pick-up 53, a servo control unit 56 for generating various servo signals, a demodulation unit 57 for demodulating the RF signal outputted from the RF amplifier 55, an error correction processing unit 58 for carrying out error correction processing of demodulated data, a cryptanalyzing unit 59 for decoding enciphered contents data, a lead-in read-out unit 60 for reading out data such as TOC data, etc. recorded in lead-in areas 2a, 3a, 4a, a discrimination unit 61 for discriminating presence or absence of identification data, a switching unit 62 for switching output from the lead-in read-out unit 60, an identification data read-out unit 63 for reading out identification data, a cipher key read-out unit 64 for carrying out extraction of cipher key data, and a control unit 65 for controlling the operation of the entirety of the data reproducing apparatus 51.

The motor 52 rotates optical disc 1 or 4 loaded at the disc loading portion comprised of disc table, etc. attached to the output shaft, e.g., at CLV. The optical pick-up 53 comprises components (not shown) such as semiconductor laser element for emitting light beams serving as light source, object lens for converging or focusing light beams emitted from this semiconductor laser element, and light detector for detecting return light beams reflected on the optical disc 1 or 4. Light beams emitted from the semiconductor laser element are converged or focused by the object lens, and are irradiated onto the signal recording surface of optical disc 1 or 4. Return light beams are detected by light detector and are caused to undergo photo-electric conversion. The light detector outputs this electric signal to the RF amplifier 55 as an output signal. The object lens is held by object lens drive mechanism such as actuator, etc., and is caused to undergo drive displacement in the focusing direction in parallel to the optical axis of the object lens and in the tracking direction perpendicular to the optical axis of the object lens. Further, this optical pick-up 53 is moved in the radial direction of the optical disc 1 or 4 by feed mechanism (not shown) in which the sled motor 54 is caused to be drive source The RF amplifier 55 generates a RF signal, a focusing error signal and a tracking error signal on the basis of an output signal from the light detector constituting the optical pick-up 53. For example, the focusing error signal is generated by the so-called astigmatism method, and the tracking error signal is generated by the so-called three-beam method or the so-called push-pull method. The RF amplifier 55 outputs RF signal to the demodulation unit 57 to output generated respective error signals to the servo control unit 56.

The servo control unit 56 generates a servo signal in reading out data which have been recorded on optical discs 1, 4. In more practical sense, the servo control unit 56 generates a focusing servo signal on the basis of the delivered focusing error signal, and generates a tracking servo signal on the basis of the delivered tracking error signal. The servo control unit 56 outputs the focusing servo signal and the tracking servo signal to drive circuit of object lens drive mechanism of the optical pick-up 53. The object lens drive mechanism allows the object lens to undergo drive displacement in the focusing direction of direction in parallel to the optical axis of the object lens by a drive signal from the drive circuit based on the delivered focusing servo signal, and allows the object lens to undergo drive displacement in the tracking direction of plane surface direction perpendicular to the optical axis of the object lens by a drive signal from the drive circuit on the basis of the tracking servo signal. The servo control unit 56 generates a servo signal of the sled motor 54 from low frequency band component of the delivered tracking error signal to output it to the sled motor 54.

In order to control the motor 52 so that the optical disc 1 or 4 can rotate at CLV, clock signal, etc. extracted from RF signal is inputted to the servo control unit 56. The servo control unit 56 carries out servo control of at least two stages of rough rotation servo control until PLL (Phase Locked Loop) based on clock signal extracted from RF signal is locked and servo control carried out in the state where PLL is locked.

When read-out of identification data recorded in the identification data recording area 7 is carried out, since the identification data recording area 7 is constituted by pit pattern where pits and lands of 3T are repeated, the servo control unit 56 cannot detect synchronizing signal similarly to other area. In view of the above, when identification data is recorded into the identification data recording area 7, the servo control unit 56 detects inversion interval from the maximum value and the minimum value of pulse width of signal, e.g., at a predetermined period of pits and lands of 3T to handle value of this detected inversion interval as a synchronizing signal to carry out rough rotation servo control. It is to be noted that the servo control unit 56 may carry out rough servo control by using, e.g., free-running frequency in addition to the above.

When data except for the identification data recording area 7 is read out, the servo control unit 56 detects the maximum inversion interval from the maximum value and the minimum value of pulse width of signal at the time of starting of rotation, etc. to carry out rough rotation servo control by using this detected maximum inversion interval as a frame synchronizing signal so that PLL can be locked thereafter to carry out rotation servo control in the state where PLL is locked, i.e., in the state where frame synchronizing signal and reference signal of the data reproducing apparatus 51 are synchronized with each other to read out TOC data such as address information, etc. so that the identification data recording area 7 can be specified. The servo control unit 56 carries out read-out of data of the area except for the identification data recording area 7 by this ordinary rotation servo control.

The error correction processing unit 58 carries out error detection and error correction processing of data which has been read out by using error correction code such as CIRC, etc. The error correction processing unit 58 is operative so that when the data which has been read out is contents data which is not enciphered, it outputs the data to which the error correction processing has been implemented from an output terminal 70 to D/A converter (not shown), etc., and while when the data which has been read out is enciphered contents data, it outputs the data to which the error correction processing has been implemented to the cryptanalyzing unit 59.

The cryptanalyzing unit 59 first decodes cryptogram of enciphered contents data delivered from the error correction processing unit 58 by using cipher key data which has been read out from the key locker area 6 and has been stored in memory, etc. The cryptanalyzing unit 59 outputs cryptanalyzed contents data, etc. from an output terminal 71 to D/A converter (not shown), etc.

The lead-in read-out unit 60 reads out data such as TOC data, etc. recorded in lead-in areas 2a, 3a, 4a. The discrimination unit 61 discriminates whether or not optical disc loaded at the disc loading unit is optical disc on which identification data is recorded, from data such as TOC data, etc. recorded in the lead-in areas 2a, 3a, 4a, i.e., presence or absence of the identification data recording area 7. With respect to detection of presence or absence of the identification data recording area 7, discrimination may be also carried out in dependency upon, e.g., whether or not repetitive pattern of lands and pits of 3T shown in FIG. 8A can be detected from RF signal based on output signal from the optical pick-up 53, or in dependency upon whether or not wobble component can be detected from wobbled pregroove as shown in FIG. 8B. In addition, data indicating presence or absence of the identification data recording area 7 may be also recorded into the lead-in area. When the discrimination unit 61 discriminates that identification data is not recorded, the disc data reproducing apparatus 51 permits reproduction of only data based on the recording format of CD or DVD, etc., e.g., contents data recorded in the program area 2b of the first session 2 of the optical disc 1. When it is judged that identification data is recorded on the optical disc loaded with respect to the disc loading unit, the discrimination unit 61 allows the switching unit 62 to be turned ON. Thus, the identification data read-out unit 63 reads out identification data from the lead-in read-out unit 60. Namely, the identification data read-out unit 63 demodulates identification data to which PE or bi-phase mark modulation, etc. has been implemented to carry out error collection processing. When the identification data read-out unit 63 can normally identify identification data, it outputs, from an output terminal 73, a permission signal which permits reproduction of the program area 3b of the second session 3 of the optical disc 1 or the program area 4b of the optical disc 4. When the identification data read-out unit 63 fails to normally identify identification data, it outputs, from an output terminal 74, a reproduction inhibit signal which inhibits reproduction of the program area 3b of the second session 3 of the optical disc 1 or the program area 4b of the optical disc 4.

A cipher key read-out unit 64 extracts cipher key data of contents data enciphered and recorded in the program area 3b of the second session 3 of the optical disc 1 or contents data enciphered and recorded in the program area 4b of the optical disc 4 from the data which has been read out at the lead-in read-out unit 60. The cipher key read-out unit 64 outputs the extracted cipher key data to the cryptanalyzing unit 59. Cipher key extracted by the cipher key read-out unit 64 may be stored into memory (not shown) to read out cipher key data from the memory when the cryptanalyzing unit 59 carries out cryptanalysis of data from the error correction processing unit 58.

Figure 14:
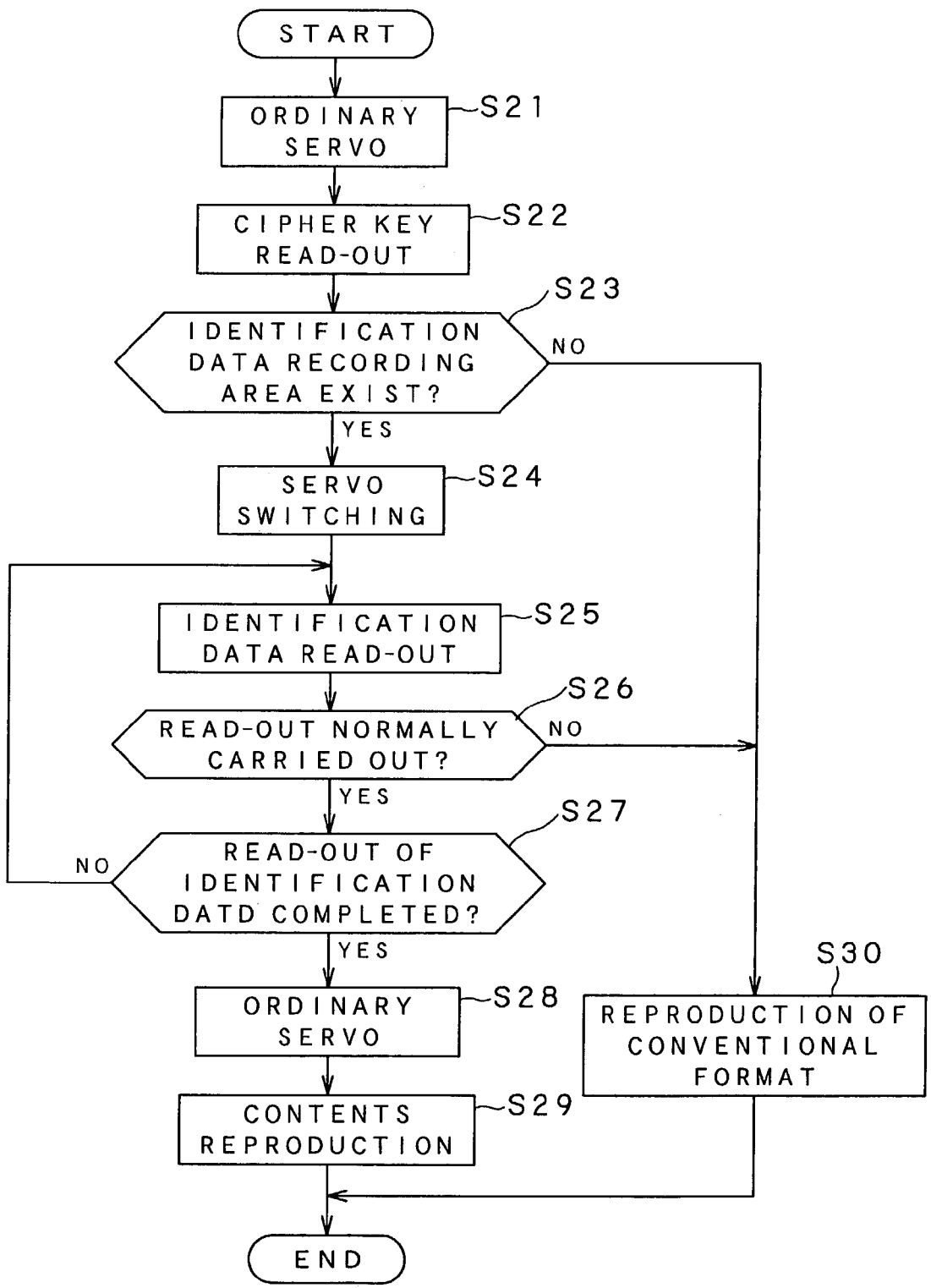
FIG. 14 is a flowchart for explaining the operation of the data reproducing apparatus.

Then, explanation will be given with reference to FIG. 14 in connection with the operation of the data reproducing apparatus 51 constituted as described above. It is to be noted that the example shown in FIG. 14 is directed to the example where cipher key data is recorded before identification data as shown in FIG. 3A.

At step S21, when optical disc 1 or optical disc 4 is loaded with respect to the disc loading portion, the data reproducing apparatus 51 drives the spindle motor 52 in order to carry out read-out of lead-in area 2a or 4a to rotate the optical disc 1 or 4, and drives the sled motor 54 to move the optical pick-up 53 toward the inner circumferential side of the loaded optical disc 1 or 4 so that there results the state where data recorded in the lead-in area 2a or 4a can be read out. Here, the servo control unit 56 detects the maximum inversion interval from the maximum value and the minimum value of pulse width of signal at the time of starting of rotation, etc. to carry out rough rotation servo control by using the detected maximum inversion interval as a frame synchronizing signal so that PLL can be locked thereafter to carry out rotation servo control in the state where PLL is locked, i.e., in the state where frame synchronizing signal and reference signal of the data reproducing apparatus 51 are synchronized with each other. The optical pick-up 53 irradiates light beams to the optical disc to detect reflected return light beams to start read-out of data recorded in the lead-in area 2a or 4a. The lead-in read-out unit 60 carries out read-out of data such as TOC data, etc. recorded in the lead-in area 2a or 4a.

It is to be noted that in the case where it is discriminated on the basis of medium identification data which has been read out from the lead-in area 2a of the optical disc 1 that loaded optical disc is optical disc 1 including the first session 2 and the second session 3, there is employed an approach to move the optical pick-up 53 to the position opposite to the lead-in area 3a of the second session 3 to carry out read-out of data of the lead-in area 3a by the above-described procedure.

At step S22, the control unit 65 controls the optical pick-up 53 so as to provide access to the key locker area 6, and the cipher key read-out unit 64 extracts cipher key data recorded in the key locker area 6 from data that the lead-in read-out unit 60 has read out. The cipher key read-out unit 64 outputs extracted cipher key data to the cryptanalyzing unit 59. The cryptanalyzing unit 59 preserves this cipher key data into, e.g., memory, etc. to have ability to use such data in reproduction of enciphered contents data.

At step S23, the discrimination unit 61 judges from data recorded in the lead-in area that the lead-in read-out unit 60 has read out whether or not the identification data recording area 7 exists on the optical disc being reproduced. When the discrimination unit 61 judges that the identification data recording area 7 exists, it allows the switching unit 62 to be turned ON so that the identification data read-out unit 63 can read out identification data from the lead-in read-out unit 60. The discrimination unit 61 outputs a signal indicating that the identification data recording area exists to the control unit 65 as discrimination result. When the discrimination unit 61 discriminates that identification data is not recorded, it allows the switching unit 62 to be turned OFF. The discrimination unit 61 outputs, as discrimination result, a signal indicating that the identification data recording area 7 does not exist to the control unit 65.

At step S24, the control unit 65 outputs, to the servo control unit 56, a switching signal for allowing rotation servo control of the motor 52 to be rough on the basis of input from the discrimination unit 61, i.e., the signal indicating that the identification data recording area 7 exists. The servo control unit 56 carries out switching from ordinary servo control, i.e., rotation servo control in the state where PLL is locked to rough rotation servo control on the basis of this switching signal. The servo control unit 56 detects inversion interval from the maximum value and the minimum value of signal at a predetermined period of pits and lands of 3T to handle value of this detected inversion interval as a synchronizing signal to carry out rough rotation servo control.

At step S25, the identification data read-out unit 63 reads out identification data from the lead-in read-out unit 60 to demodulate identification data to which PE or bi-phase mark modulation, etc. has been implemented to carry out error correction processing. Here, the identification data recording area 7 where identification data is recorded is provided after the key locker area 6 where cipher key data is recorded. Accordingly, the optical pick-up 53 can quickly and easily provide access from the key locker area 6 to the identification data recording area 7.

At step S26, the identification data read-out unit 63 judges whether or not identification data can be normally read out. When it is judged that identification data can be normally read out, the identification data read-out unit 63 outputs, to the control unit 65, a permission signal which permits reproduction of the program area 3b of the second session 3 of the optical disc 1 or the program area 4b of the optical disc 4. When error takes place, or demodulation/error correction processing are not correctly carried out so that identification data cannot be normally read out, the identification data read-out unit 63 outputs, to the control unit 65, a reproduction inhibit signal which inhibits reproduction of the program area 3b of the second session 3 of the optical disc 1 or the program area 4b of the optical disc 4.

At step S27, the identification data read-out unit 63 judges whether or not read-out of identification data recorded in the identification data recording area 7 is normally completed. When read-out of identification data is normally completed, the identification data read-out unit 63 outputs an end signal of read-out of identification data to the control unit 65. When read-out of identification data is not completed, processing by the identification data read-out unit 63 returns to the step S25 in order to continue read-out of identification data.

At step S28, when the end signal indicating that read-out of identification data from the identification data read-out unit 63 is completed is inputted, the control unit 65 outputs, to the servo control unit 56, a switching signal for switching rotation servo control of the motor 52 which rotates optical disc from rough state to normal state. The servo control unit 56 carries out switching into ordinary rotation servo control carried out in the state where PLL is locked.

When enciphered contents data of the program area 3*b* of the second session 3 of the optical disc 1 or the program area 4*b* of the optical disc 4 is reproduced, the demodulation unit 57 demodulates data which has been caused to undergo EFM or 8-16 modulation at step S29 to output it to the error correction processing unit 58. The error correction processing unit 58 carries out error detection and error correction processing by using error correction code added to the demodulated data to output the data thus obtained to the cryptanalyzing unit 59. The cryptanalyzing unit 59 decodes cryptogram implemented to contents data which has been read out from the program area 3*b* or the program area 4*b* by using cipher key data which has been read out from the key locker area 6 by the cipher key read-out unit 64. The cryptanalyzed contents data is outputted to speaker or picture image display unit through D/A converter (not shown) from the output terminal 71.

When the discrimination unit 61 outputs, to the control unit 65, a signal indicating that the identification data recording area 7 does not exist because the identification data recording area 7 is not provided on the optical disc loaded with respect to the disc loading portion at the step S23, or when the identification data read-out unit 63 fails to normally read out identification data from the identification data recording area 7 to output reproduction inhibit signal to the control unit 65, the control unit 65 inhibits reproduction of the program area 3*b* of the second session 3 of the optical disc 1 or the program area 4*b* of the optical disc 4. Namely, the data reproducing apparatus 51 cannot carry out reproduction of the program area 3*b* of the second session 3 of the optical disc 1 or the program area 4*b* of the optical disc 4 so that there can be made reproduction of only data recorded by the same recording format as that of the existing CD or DVD, e.g., as in the case of contents data recorded in the program area 2*b* of the first session 2 of the optical disc 1. Data recorded by the same recording format as that of the existing CD or DVD is demodulated at the demodulation unit 57, and is then caused to undergo error detection/error correction processing at the error correction processing unit 58. Since data outputted from this correction processing unit 58 is not enciphered data, such data is not outputted to the cryptanalyzing unit 59, but is outputted to speaker or picture image display unit through D/A converter (not shown) from the output terminal 70.

Then, explanation will be given by using FIG. 15 in connection with the operation of the data reproducing apparatus 51 when there is reproduced optical disc 1 or 4 on which identification data is recorded before cipher key data as shown in FIG. 3B.

At step S31, when optical disc 1 or optical disc 4 is loaded with respect to the disc loading portion, the data reproducing apparatus 51 drives the motor 52 to rotate optical disc 1 or 4, and drives the sled motor 54 in order to carry out read-out of the lead-in area 2*a* or 4*a* to move the optical pick-up 53 toward the inner circumferential side of the optical disc 1 or 4 so that there results the state where data recorded in the lead-in area 2*a* or 4*a* can be read out. Here, the servo control unit 56 detects the maximum inversion interval from the maximum value and the minimum value of pulse width on the basis of an output signal from the optical pick-up 53 at the time of starting of rotation, etc. to carry out rough rotation servo control by using the detected maximum inversion interval as a frame synchronizing signal so that PLL can be locked thereafter to carry out rotation servo control in the state where PLL is locked, i.e., in the state where frame synchronizing signal and reference signal of the data reproducing apparatus 51 are synchronized with each other. The optical pick-up 53 irradiates light beams to the optical disc 1 or 4 to detect return light beams reflected by the optical disc to start read-out of data recorded in the lead-in area 2*a* or 4*a*. The lead-in read-out unit 60 carries out readout of data such as TOC data, etc. recorded in the lead-in area 2*a* or 4*a*.

It is to be noted that when it is discriminated similarly to FIG. 14 on the basis of medium identification data which has been read out from the lead-in area 2*a* of the optical disc 1 that the optical disc 1 is optical disc including the second session 3, the optical pick-up 53 is moved to the position opposite to the lead-in area 3*a* of the optical disc 1 to read out data recorded in the lead-in area 3*a* by the above-described procedure.

At step S32, the discrimination unit 61 judges from data recorded in the lead-in area 2*a* or 4*a* whether or not the identification data recording area 7 exists on the optical disc 1 or 4 being reproduced. When the discrimination unit 61 judges that the identification data recording area 7 exists, it allows the switching unit 62 to be turned ON so that the identification data read-out unit 63 is permitted to read out identification data from the lead-in read-out unit 60. The discrimination unit 61 outputs a signal indicating that the identification data recording area 7 exists to the control unit 65 as discrimination result. When the discrimination unit 61 discriminates that the identification data recording area 7 does not exist, i.e., the identification data is not recorded, the discrimination unit 61 allows the switching unit 62 to be turned OFF. The discrimination unit 61 outputs a signal indicating that the identification data recording area 7 does not exist to the control unit 65 as discrimination result.

At step S33, the control unit 65 outputs, to the servo control unit 56, a switching signal for allowing rotation servo control of the motor 52 to be rough on the basis of input from the discrimination unit 61, i.e., a signal indicating that the identification data recording area 7 exists. The servo control unit 56 carries out switching from the ordinary servo control, i.e., rotation servo control in the state where PLL is locked to rough rotation servo control on the basis of this switching signal. The servo control unit 56 detects inversion interval from the maximum value and the minimum value of pulse width of signal at a predetermined period of pits and lands of 3T to handle this value as a synchronizing signal to carry out rough rotation servo control.

At step S34, the identification data read-out unit 63 reads out identification data from the lead-in read-out unit 60 to demodulate the identification data to which PE or bi-phase mark modulation, etc. is implemented to carry out error detection/error correction processing.

At step S35, the identification data read-out unit 63 judges whether or not identification data has been normally read out. When the identification data read-out unit 63 can normally read out identification data, it outputs, to the control unit 65, a permission signal which permits reproduction of the program area 3*b* of the second session 3 of the optical disc 1 or the program area 4*b* of the optical disc 4. When the identification data read-out unit 63 cannot normally read out identification data for the reason why, e.g., demodulation cannot be correctly carried out or error correction cannot be carried out, etc., it outputs, to the control unit 65, a reproduction inhibit signal which inhibits reproduction of the program area 3*b* of the second session 3 of the optical disc 1 or the program area 4*b* of the optical disc 4.

At step S36, the identification data read-out unit 63 judges whether or not read-out of identification data recorded in the identification data recording area 7 is normally completed. Further, when read-out of identification data is completed, the identification data read-out unit 63 outputs an end signal of read-out of identification data to the control unit 65. When read-out of identification data is not yet completed, processing by the identification data read-out unit 63 returns to the step S34 in order to continue read-out of identification data.

When read-out of identification data is completed, the control unit 65 outputs, to the servo control unit 56, at step S37, a switching signal for switching rotation servo control of the motor 52 which rotates the optical disc from rough state to normal state in the case where an end signal indicating that read-out of identification data from the identification data read-out unit 63 is completed is inputted. The servo control unit 56 carries out switching into the ordinary rotation servo control carried out in the state where PLL is locked.

At step S38, the control unit 65 controls the optical pick-up 53 in order to provide access to the key locker area 6, and the cipher key read-out unit 64 extracts cipher key data recorded in the key locker area 6 from data that the lead-in read-out unit 60 has read out. The cipher key read-out unit 64 outputs cipher key data to the cryptanalyzing unit 59. The cryptanalyzing unit 59 preserves this cipher key data into, e.g., memory, etc. so that such cipher key data can be used in reproduction of enciphered contents data. Here, the key locker area 6 where cipher key data is recorded is provided next to the identification data recording area 7 where identification data is recorded. Accordingly, the optical pick-up 53 can quickly provide access from the identification data recording area 7 to the key locker area 6.

At step S39, when contents data enciphered in the program area 3b of the second session 3 of the optical disc 1 or the program area 4b of the optical disc 4 is reproduced, the demodulation unit 57 demodulates data to which EFM or 8-16 modulation is implemented to output it to the error correction processing unit 58. The error correction processing unit 58 carries out error detection/error correction processing by using error correction code added to the demodulated data to output it to the cryptanalyzing unit 59. The cryptanalyzing unit 59 decodes cryptogram of data outputted from the error correction processing unit 58 by using cipher key data which has been read out from the key locker area 6 by the cipher key read-out unit 64. The cryptanalyzed contents data is outputted to speaker or picture image display unit through D/A converter (not shown) from the output terminal 71.

When the discrimination unit 61 outputs, to the control unit 65, a signal indicating that the identification data recording area 7 does not exist because the identification data recording area 7 is not provided on the optical disc loaded with respect to the disc loading portion at the step S32, or when the identification data read-out unit 63 fails to normally read out identification data from the identification data recording area 7 to output a reproduction inhibit signal to the control unit 65 at the step S35, processing by the control unit 65 proceeds to step S40. Thus, the control unit 65 inhibits reproduction of the program area 3b of the second session 3 of the optical disc 1 or the program area 4b of the optical disc 4. Namely, the data reproducing apparatus 51 fails to carry out reproduction of the program area 3b of the second session 3 of the optical disc 1 or the program area 4b of the optical disc 4, and permits reproduction of only data recorded by the same format as that of the existing CD or DVD, e.g., as in the case of contents data recorded in the program area 2b of the first session 2 of the optical disc 1. The data recorded by the same recording format as that of the existing CD or DVD is demodulated at the demodulation unit 57, and is then caused to undergo error correction processing at the error correction processing unit 58. Since data outputted from the error correction processing unit 58 is not enciphered data, such data is not outputted to the cryptanalyzing unit 59, but is outputted to speaker or picture image display unit through D/A converter (not shown) from the output terminal 70.

Figure 15:
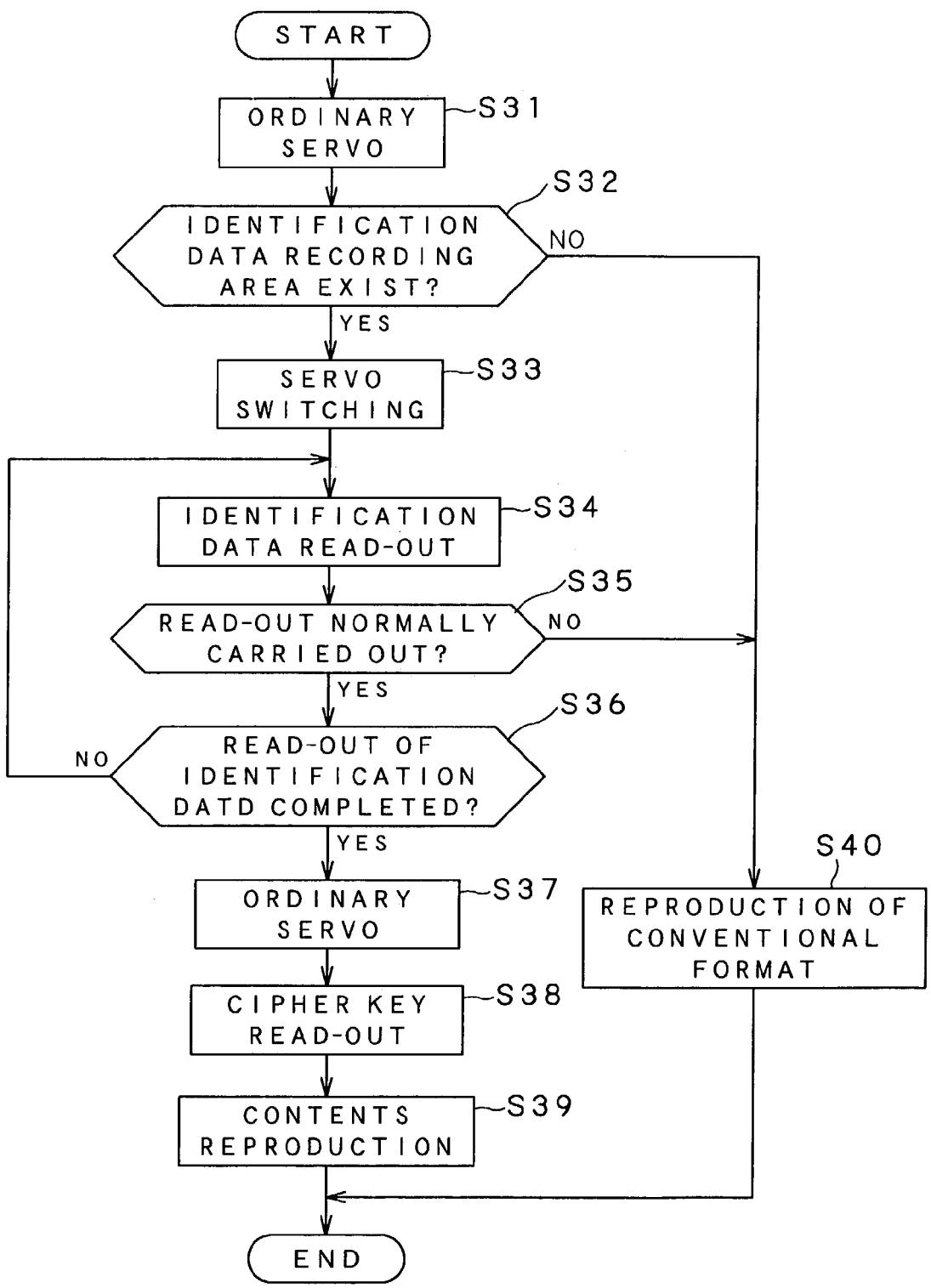
FIG. 15 is a flowchart for explaining another example of the operation of the data reproducing apparatus.

It is to be noted that when identification data recording areas 7 are provided before and after key locker area 6 as shown in FIG. 3C, it is sufficient to carry out the processing shown in FIG. 14 when access to identification data recording area 7 before key locker area 6 is provided, and to carry out the processing shown in FIG. 15 when access to identification data recording area 7 after key locker area 6 is provided.

The data reproducing apparatus 51 as described above can reproduce contents data recorded in the program area 3b of the second session 3 of the optical disc 1, or contents data recorded in the program area 4b of the optical disc 4 only when identification data can be read out from the optical disc 1 or 4, and can also read out data recorded by the same recording format as that of the existing CD or DVD, e.g., contents data recorded in the program area 2b of the first session 2 of the optical disc 1.

While explanation has been given in the above-mentioned example by taking, as an example, the data reproducing apparatus 51 adapted for recording identification data or cipher key data into the lead-in area 3a of the second session 3 of the optical disc 1 or the lead-in area 4a of the optical disc 4 to start access from the inner circumferential side of the disc, the present invention is not limited to such implementation. For example, in the case of a data reproducing apparatus adapted to start access from the outer circumferential side of the optical disc, there may be employed an approach to record identification data or cipher key data into the lead-out area 3c of the second session 3 of the optical disc 1 or the lead-out area 4c of the optical disc 4.

The optical disc 1 is adapted so that the lead-out area 2c of the first session 2 and the lead-in area 3a of the second session 3 are provided at the positions close to each other. Accordingly, in the present invention, there may be employed an approach to record cipher key data into the lead-out area 3c of the first session 3, and to record identification data into the lead-in area 3a of the second session. On the contrary there may be also employed an approach to record identification data into the lead-out area 3c of the first session 3, and to record cipher key data into the lead-in area 3a of the second session.

INDUSTRIAL APPLICABILITY

The recording medium according to the present invention comprises first recording area where enciphered data is recorded, and second recording area provided at the position where read-out is carried out prior to the first recording area and including first area portion where cipher key data for decoding enciphered data is recorded and second area portion where data modulated by modulation system different from that of at least the first area portion is recorded. Accordingly, in order to read out enciphered data recorded in the first recording area, read-out of cipher key data for decoding enciphered data of the second recording area is required. Therefore, reliable protection of enciphered data is realized. Further, since data such as identification data peculiar to recording medium, etc. is recorded in the second area portion of the second recording area in the state modulated by the modulation system different from that of the first area portion, it is possible to easily carry out management of recording media.

The invention claimed is:

1. A recording and/or reproducing apparatus for a recording medium, comprising:
   a rotation drive unit for rotationally driving a recording medium having a first recording area where enciphered data is recorded, and a second recording area provided at a position where a read-out operation is carried out ahead of the first recording area and including a first area portion where cipher key data for decoding the enciphered data is recorded and a second area portion where a guide portion for recording data modulated by a modulation system different from a modulation system of the first area portion is formed;
   a head unit for scanning the recording medium; and
   a control unit for rotationally controlling the rotation drive unit based on an output signal from the head unit and for carrying out switching of rotation control of the rotation drive unit at least between the first area portion and the second area portion;
   wherein the control unit is operative so that when the first area portion is scanned by the head portion, the control unit carries out control of the rotation drive unit based on a synchronizing signal detected from an output signal from the head unit, and when the second area portion is scanned by the head unit the control unit carries out rotation control of the rotation drive unit based on an inversion time period detected from an output signal from the head unit.

2. A recording and/or reproducing apparatus for a recording medium, comprising:
   a rotation drive unit for rotationally driving a recording medium having a first recording area where enciphered data is recorded, and a second recording area provided at a position where a read-out operation is carried out ahead of the first recording area and including a first area portion where cipher key data for decoding the enciphered data is recorded and a second area portion where a guide portion for recording data modulated by a modulation system different from a modulation system of the first area portion is formed;
   a head unit for scanning the recording medium; and
   a control unit for rotationally controlling the rotation drive unit based on an output signal from the head unit and for carrying out switching of rotation control of the rotation drive unit at least between the first area portion and the second area portion;
   wherein the control unit is operative so that when the first area portion is scanned by the head unit the control unit carries out control of the rotation drive unit based on maximum inversion time period detected from an output signal of the head unit, and when the second area portion is scanned by the head unit the control unit carries out rotation control of the rotation drive unit based on inversion time period detected from an output signal from the head unit.

3. The recording and/or reproducing apparatus as set forth in claim 2, wherein the control unit switches rotation control of the rotation drive unit based on address information extracted from a signal read out from the recording medium by the head unit.

4. A recording apparatus for a recording medium, comprising:
   a rotation drive unit for rotationally driving a recording medium having a first recording area where enciphered data is recorded, and a second recording area provided at a position where a read-out operation is carried out ahead of the first recording area and including a first area portion where cipher key data for decoding the enciphered data is recorded and a second area portion adjacent the first area portion and in which a guide portion for recording data is formed;
   a modulation unit for modulating inputted data by a modulation system different from a modulation system of the first area portion;
   a head unit for scanning the recording medium and for recording output data from the modulation unit into the second area portion along the guide portion; and
   a control unit for carrying out switching so that an output level when the head unit scans the second area portion to record data modulated by a modulation system different from a modulation system of the first area portion is higher than an output level when the head unit scans the first area portion to record modulated data;
   wherein the control unit rotationally controls the rotation drive unit based on an output signal from the head unit, and carries out switching of control of the rotation drive unit at least between the first area portion and the second area portion.

5. The recording apparatus for recording medium as set forth in claim 4, wherein the control unit detects, based on address information extracted from a signal read out from the recording medium by the head unit, whether the head unit reaches the second area portion.

6. The recording apparatus for recording medium as set forth in claim 4, wherein the modulation unit implements one of a phase modulation and a bi-phase mark modulation.

7. The recording apparatus for recording medium as set forth in claim 6, wherein the inputted data is identification data peculiar to the recording medium.

8. The recording apparatus for recording medium as set forth in claim 4, wherein the control unit is operative so that when the first area portion is scanned by the head unit, the control unit carries out control of the rotation drive unit based on a synchronizing signal detected from an output signal from the head unit, and when the second area portion is scanned by the head unit the control unit carries out rotation control of the rotation drive unit based on an inversion time period detected from an output signal from the head unit.

9. The recording apparatus for recording medium as set forth in claim 4, wherein the control unit is operative so that when the first area portion is scanned by the head unit, the control unit carries out control of the rotation drive unit based on a maximum inversion time period detected from an output signal from the head unit, and when the second area portion is scanned by the head unit the control unit carries out rotation control of the rotation drive unit based on an inversion time period detected from an output signal from the head unit.

10. The recording apparatus for recording medium as set forth in claim 4 wherein the control unit switches rotation control of the rotation drive unit based on address information extracted from a signal read out from the recording medium by the head unit.

11. A reproducing apparatus for a recording medium, comprising:
- a rotation drive unit for rotationally driving a recording medium having a first recording area where enciphered data is recorded, and a second recording area provided at a position where a read-out operation is carried out ahead of the first recording area and including a first area portion where cipher key data for decoding the enciphered data is recorded and a second area portion where data modulated by a modulation system different from a modulation system of the first area portion is recorded;
- a head unit for scanning the recording medium; and
- a control unit for rotationally controlling the rotation drive unit based on an output signal from the head unit, and for discriminating whether the recording medium is a recording medium including the second area portion, whereby when it is discriminated that the recording medium is the recording medium including the second area portion, the control unit switches control of the rotation drive unit;
- wherein the control unit is operative so that when data recorded in the second area portion fails to be read out, the control unit carries out rotation control based on the synchronizing signal with respect to the rotation drive unit.

12. The reproducing apparatus for recording medium as set forth in claim 11, wherein the control unit is operative so that when the first area portion is scanned by the head unit, the control unit carries out control of the rotation drive unit based on a synchronizing signal detected from an output signal from the head unit, and when the second area portion is scanned by the head unit the control unit carries out rotation control of the rotation drive unit based on an inversion time period detected from an output signal from the head unit.

13. The reproducing apparatus for recording medium as set forth in claim 12, wherein the control unit first discriminates in a control state of the rotation drive unit based on the synchronizing signal whether the recording medium includes the second area portion, whereby when it is discriminated that the recording medium is the recording medium including the second area portion, the control unit carries out rotation control of the rotation drive unit based on the inversion time period.

14. The reproducing apparatus for recording medium as set forth in claim 13, wherein the control unit carries out rotation control of the rotation drive unit based on the synchronizing signal after read-out of data recorded in the second area portion is completed.

15. The reproducing apparatus for recording medium as set forth in claim 14, wherein the control unit moves the head unit to the first recording area after the read-out operation of data recorded in the second area portion is completed to start the read-out operation of data recorded in the first recording area.

16. The reproducing apparatus for recording medium as set forth in claim 11, wherein data modulated by the different modulation system is identification data peculiar to the recording medium.

17. The reproducing apparatus for recording medium as set forth in claim 11 wherein the control unit is operative so that when the first area portion is scanned by the head unit, the control unit carries out control of the rotation drive unit based on a maximum inversion time period detected from an output signal from the head unit, and when the second area portion is scanned by the head unit the control unit carries out rotation control of the rotation drive unit based on an inversion time period detected from an output signal from the head unit.

18. The reproducing apparatus for recording medium as set forth in claim 17, wherein the control unit first discriminates in a rotation control state of the rotation drive unit based on the detected maximum inversion time period whether the recording medium includes the second area portion, whereby when it is discriminated that the recording medium is the recording medium including the second area portion, the control unit carries out rotation control of the rotation drive unit based on the inversion time period.

19. The reproducing apparatus for recording medium as set forth in claim 17, wherein the control unit carries out rotation control of the rotation drive unit based on the detected maximum inversion time period after the read-out operation of data recorded in the second area portion is completed.

20. The reproducing apparatus for recording medium as set forth in claim 11, wherein the control unit moves the head unit to the first recording area after the read-out operation of data recorded in the second area portion is completed to start the read-out operation of data recorded in the first recording area.

21. The reproducing apparatus for recording medium as set forth in claim 11, wherein the control unit switches a rotation control of the rotation drive unit based on address information extracted from a signal read out from the recording medium by the head unit.

22. A reproducing method for a recording medium, comprising the steps of:
- discriminating whether a loaded recording medium is a recording medium having a first recording area where enciphered data is recorded, and a second recording area provided at a position where a read-out operation is carried out ahead of the first recording area and including a first area portion where cipher key data for decoding the enciphered data is recorded and a second area portion where data modulated by a modulation system different from a modulation system of the first area portion is recorded;
- reading out, by using a head unit, data modulated by the different modulation system recorded in the second area portion when the loaded recording medium is a recording medium including the second area portion; and
- inhibiting reading out of data recorded in the first recording area when data modulated by the different modulation system fails to be correctly read out from the recording medium;
- decoding and reproducing enciphered data read out from the first recording area based on cipher key for decoding the enciphered data read out when data modulated by the different modulation system is correctly read out from the recording medium.

23. The reproducing method for recording medium as set forth in claim 22, further comprising the step of carrying out rotation control of the recording medium based on a synchronizing signal detected from an output signal from the head unit when the first area portion is scanned by the head unit, and carrying out rotation control of the recording area based on an inversion time period detected from an output signal from the head unit when the second area portion is scanned by the head unit.

24. The reproducing method for recording medium as set forth in claim 23, further comprising the step of first discriminating in a rotation control state of the recording medium based on the synchronizing signal whether the recording medium includes the second area portion, whereby when it is discriminated that the recording medium is recording medium including the second area portion, rotation control of the recording medium based on the inversion time period is carried out.

25. The reproducing method for recording medium as set forth in claim 22, further comprising the step of carrying out rotation control of the recording medium based on a maximum inversion time period detected from an output signal from the head unit when the first area portion is scanned by the head unit, and carrying out rotation control of the recording medium based on an inversion time period detected from an output signal from the head unit when the second area portion is scanned by the head unit.

26. The reproducing method for recording medium as set forth in claim 25, further comprising the step of first discriminating in the rotation control state of the recording medium based on the detected maximum inversion time period, and carrying out rotation control of the recording medium based on the inversion time period when it is discriminated that the recording medium is recording medium including the second area portion.

27. The reproducing method for recording medium as set forth in claim 22, further comprising the step of switching rotation control of the recording medium based on address information extracted from a signal read out by the head unit.

* * * * *

UNITED STATES PATENT AND TRADEMARK OFFICE
CERTIFICATE OF CORRECTION

PATENT NO. : 7,240,221 B2
APPLICATION NO. : 10/362402
DATED : July 3, 2007
INVENTOR(S) : Yoichiro Sako, Takashi Kihara and Shinichi Kazami It is certified that error appears in the above-identified patent and that said Letters Patent is hereby corrected as shown below:

On the Title Page item 54, the title should read --RECORDING MEDIUM FOR DATA, RECORDING AND/OR REPRODUCING APPARATUS AND RECORDING AND REPRODUCING METHOD FOR RECORDING MEDIUM--;

In Column 1, the title should read --RECORDING MEDIUM FOR DATA, RECORDING AND/OR REPRODUCING APPARATUS AND RECORDING AND REPRODUCING METHOD FOR RECORDING MEDIUM--; and In Column 28, Line 52, insert --data-- after "key".

Signed and Sealed this

Seventeenth Day of June, 2008

JON W. DUDAS
*Director of the United States Patent and Trademark Office*